(12) United States Patent
Ackeret et al.

(10) Patent No.: US 9,296,340 B2
(45) Date of Patent: Mar. 29, 2016

(54) DEVICE FOR ATTACHING A TABLET COMPUTER

(75) Inventors: Peter Ackeret, Zürich (CH); Juergen Siegfried Skott, Altensteig (DE)

(73) Assignee: Kinetix AG, Glarus (CH)

( * ) Notice: Subject to any disclaimer, the term of this patent is extended or adjusted under 35 U.S.C. 154(b) by 392 days.

(21) Appl. No.: 13/574,783

(22) PCT Filed: Mar. 28, 2011

(86) PCT No.: PCT/EP2011/054748
§ 371 (c)(1),
(2), (4) Date: Oct. 10, 2012

(87) PCT Pub. No.: WO2011/092348
PCT Pub. Date: Aug. 4, 2011

(65) Prior Publication Data
US 2013/0193174 A1    Aug. 1, 2013

(30) Foreign Application Priority Data

| May 10, 2010 | (DE) | 10 2010 020 082 |
| May 25, 2010 | (DE) | 10 2010 021 372 |
| Jun. 17, 2010 | (DE) | 10 2010 024 095 |
| Jul. 12, 2010 | (DE) | 10 2010 026 941 |
| Jan. 28, 2011 | (WO) | PCT/EP2011/000393 |

(51) Int. Cl.
| *B60R 7/04* | (2006.01) |
| *B60R 11/02* | (2006.01) |
| *F16M 11/10* | (2006.01) |
| *F16M 11/20* | (2006.01) |
| *F16M 11/28* | (2006.01) |
| *F16M 13/00* | (2006.01) |

(Continued)

(52) U.S. Cl.
CPC ............... *B60R 7/04* (2013.01); *B60R 11/0252* (2013.01); *F16M 11/105* (2013.01); *F16M 11/2021* (2013.01); *F16M 11/28* (2013.01); *F16M 13/00* (2013.01); *F16M 13/022* (2013.01); *B60R 2011/0017* (2013.01); *B60R 2011/0087* (2013.01)

(58) Field of Classification Search
CPC ...................... F16M 11/043; B60R 2011/0075
USPC ......................................... 224/275, 554, 929
See application file for complete search history.

(56) References Cited

U.S. PATENT DOCUMENTS 2,549,753 A * 4/1951 Ashman .......................... 108/45
5,092,552 A * 3/1992 Dayton et al. ........... 248/280.11

(Continued)

FOREIGN PATENT DOCUMENTS

| CN | 2683459 | 3/2005 |
| CN | 2868770 | 2/2007 |

(Continued)

*Primary Examiner* — Brian D Nash
(74) *Attorney, Agent, or Firm* — Paul Vincent

(57) ABSTRACT

A device for attaching a tablet computer to the rear-side of a motor vehicle seat has a support (5, 50, 50', 50", 59, 150) for receiving the tablet computer (6, 60). The support (5, 50, 50', 50", 59, 150) can be moved between a first position in which the screen (6a, 60a, 60a', 60a", 160a) of the tablet computer (6, 60) is arranged on the side opposite the vehicle seat part (1a, 1b, 1c, 1c', 1c", 10a, 10a', 10b, 10c) and aligned essentially vertically and a second user position in which the screen (6a, 60a, 60a', 60a", 160a) is oriented upwards and essentially horizontally or oblique.

21 Claims, 25 Drawing Sheets

(51) Int. Cl.
*F16M 13/02* (2006.01)
*B60R 11/00* (2006.01)

(56) References Cited

U.S. PATENT DOCUMENTS

| | | | |
|---|---|---|---|
| 5,553,820 A * | 9/1996 | Karten et al. | 248/286.1 |
| 6,464,185 B1 | 10/2002 | Whiteside | |
| 6,663,064 B1 * | 12/2003 | Minelli et al. | 248/205.5 |
| 6,966,533 B1 * | 11/2005 | Kalis et al. | 248/316.4 |
| 7,766,288 B2 * | 8/2010 | Kim et al. | 248/176.1 |
| 8,235,334 B1 * | 8/2012 | Kobal | 248/122.1 |
| 8,794,579 B2 * | 8/2014 | Sturman et al. | 248/284.1 |
| 8,800,942 B2 * | 8/2014 | Yu | 248/122.1 |
| 2005/0174498 A1 | 8/2005 | Wu | |
| 2006/0032996 A1 | 2/2006 | Wu | |
| 2010/0043503 A1 | 2/2010 | Yao | |
| 2011/0297711 A1 * | 12/2011 | Yu et al. | 224/272 |
| 2012/0006870 A1 * | 1/2012 | Proctor et al. | 224/275 |
| 2012/0312847 A1 * | 12/2012 | LaColla et al. | 224/275 |

FOREIGN PATENT DOCUMENTS

| | | |
|---|---|---|
| CN | 101657080 | 2/2010 |
| DE | 20 2004 018 904 | 2/2005 |
| DE | 20 2005 018 633 | 4/2006 |
| DE | 20 2009 013 607 | 12/2009 |
| WO | WO 2004/028861 | 4/2004 |

* cited by examiner

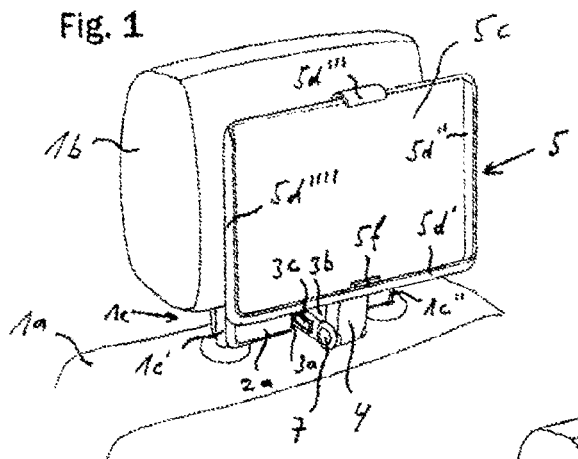
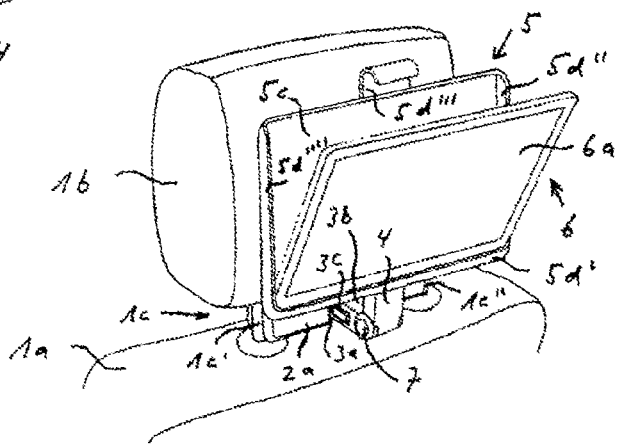
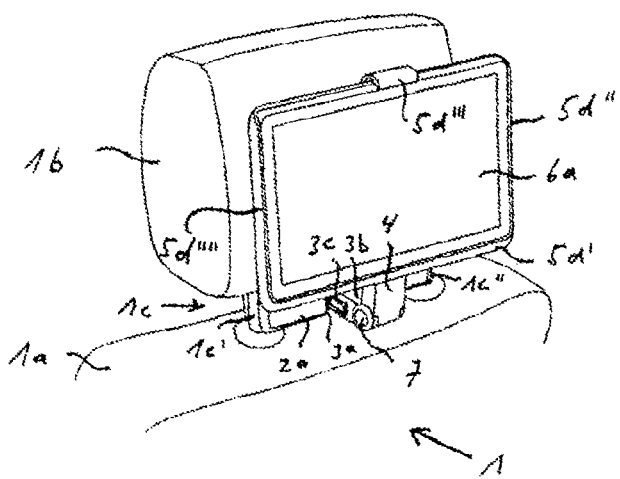

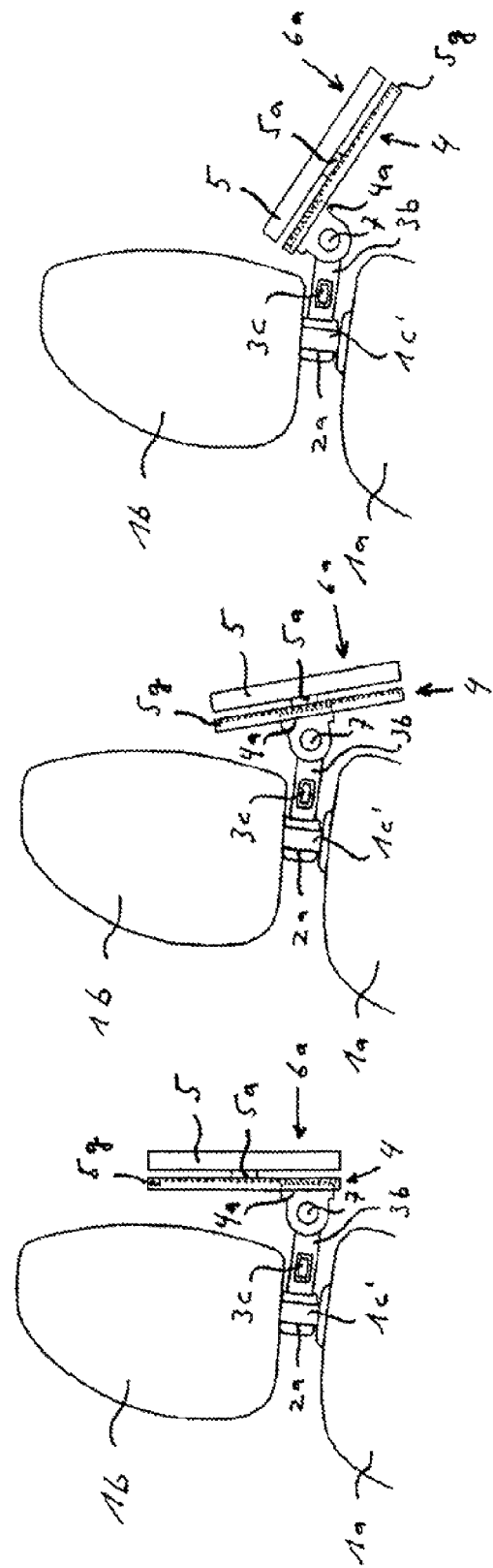

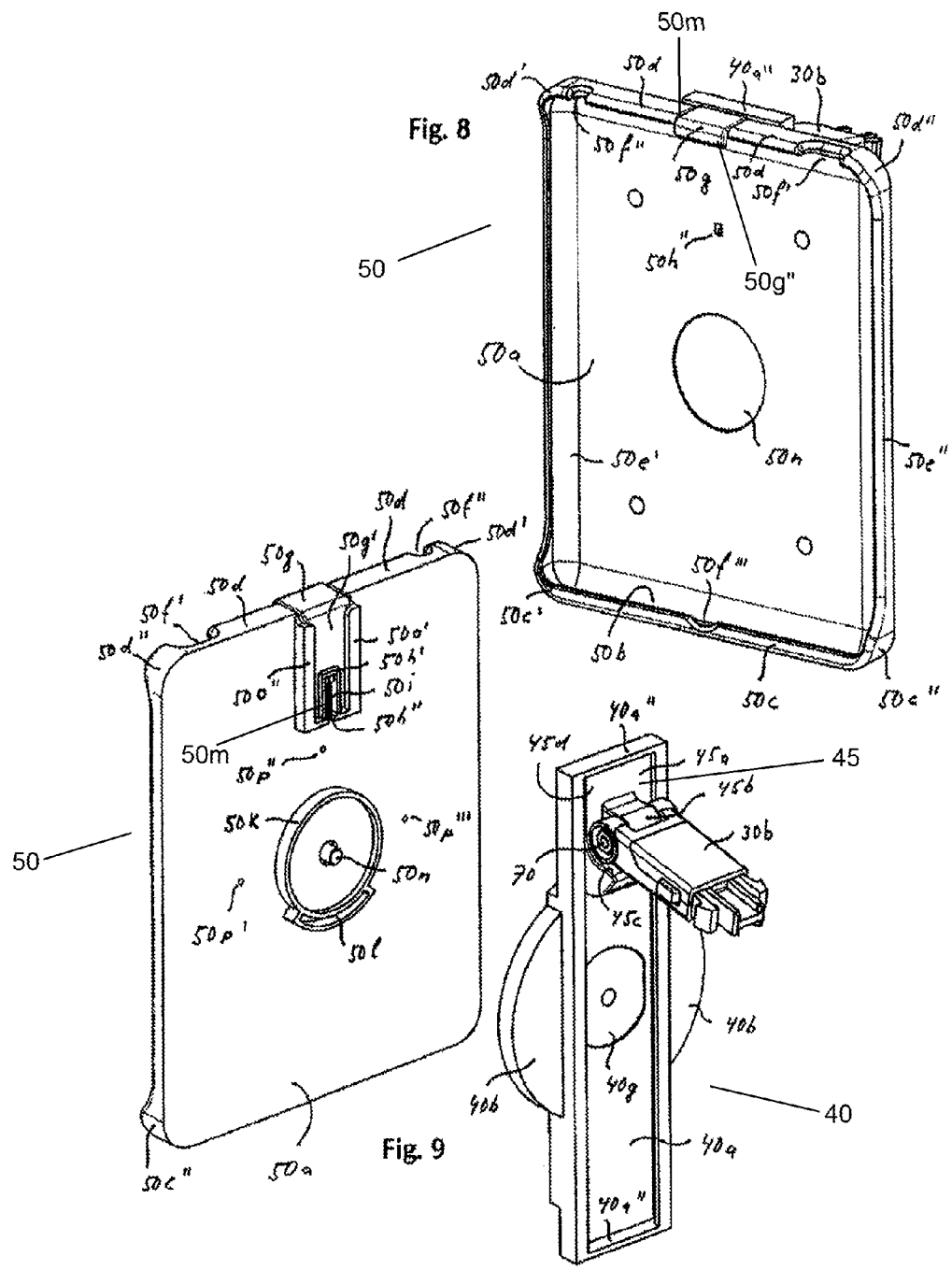

Fig. 10
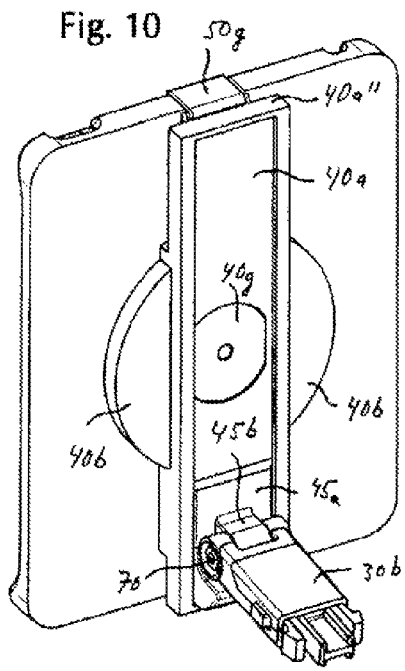
Fig. 11
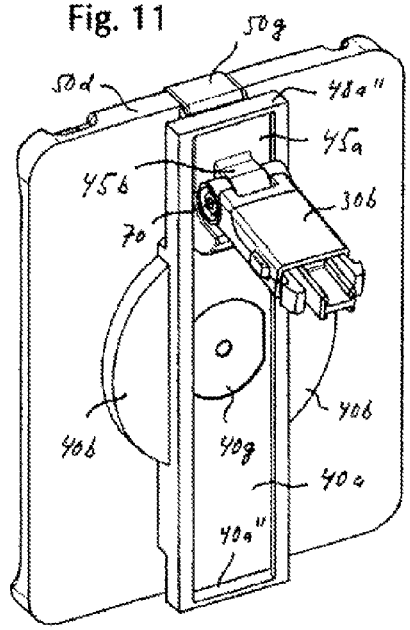
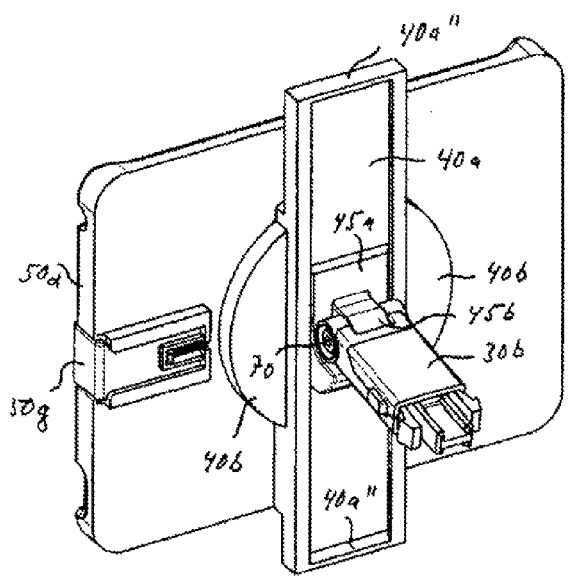
Fig. 12
Fig. 13

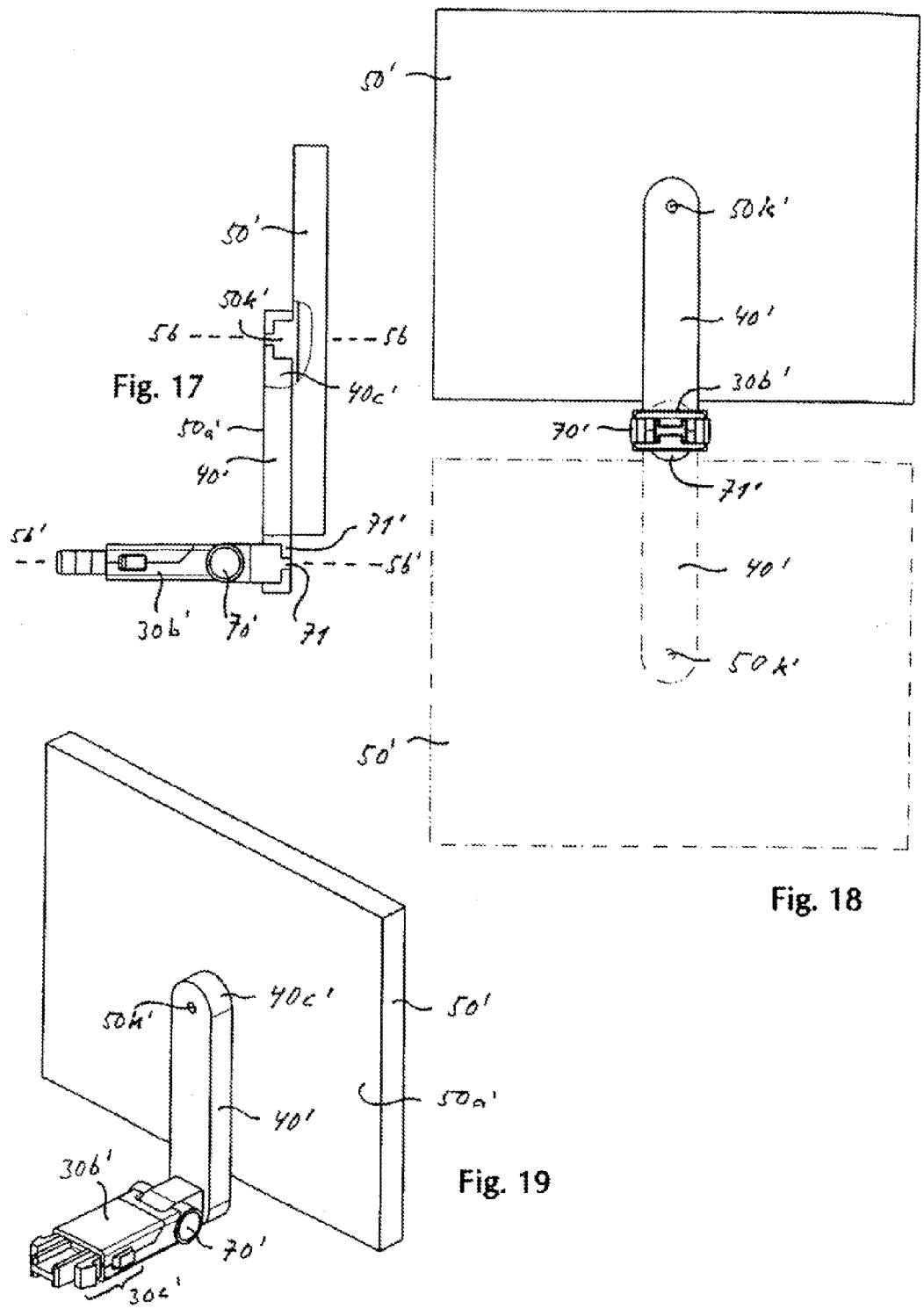

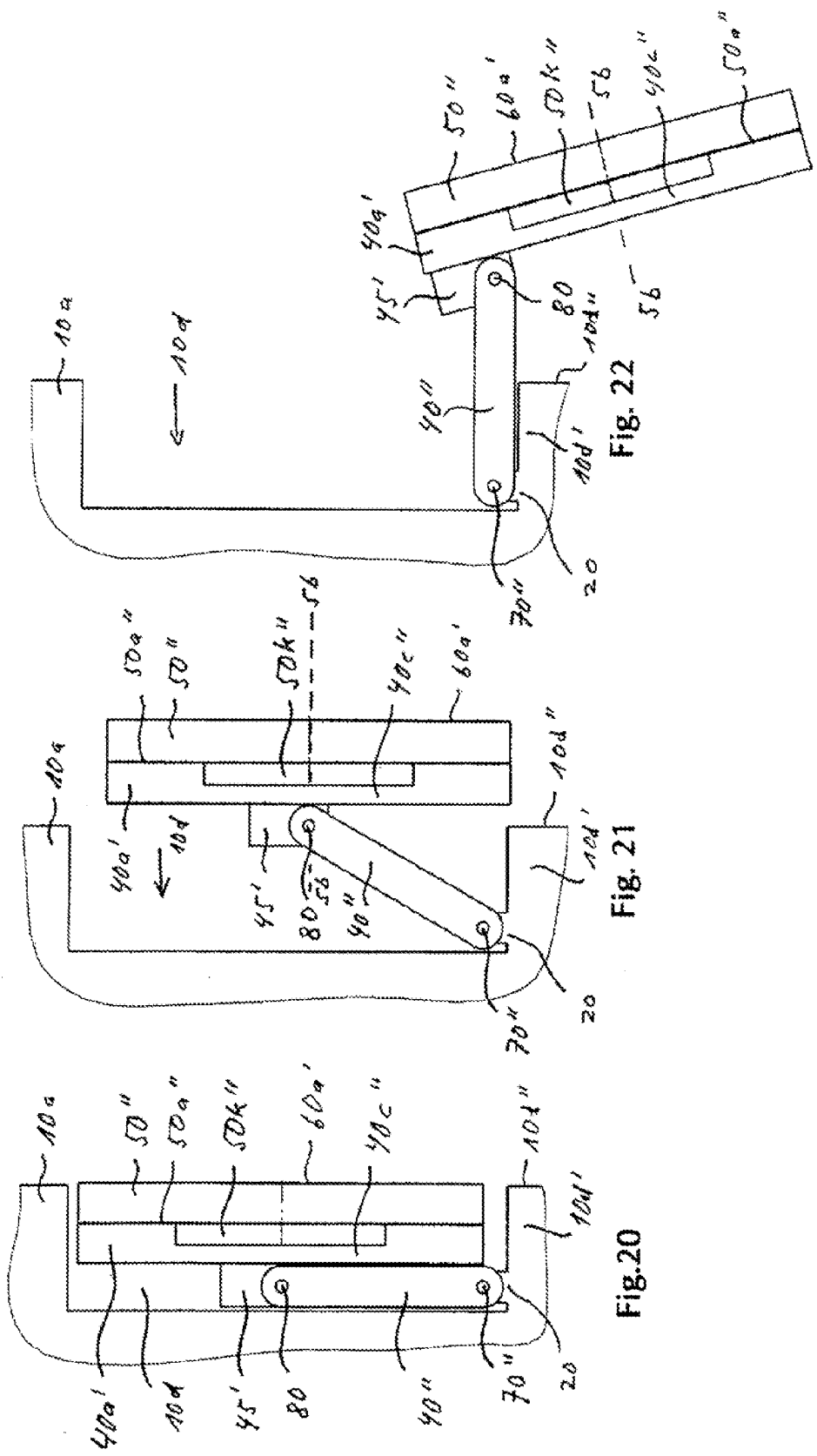

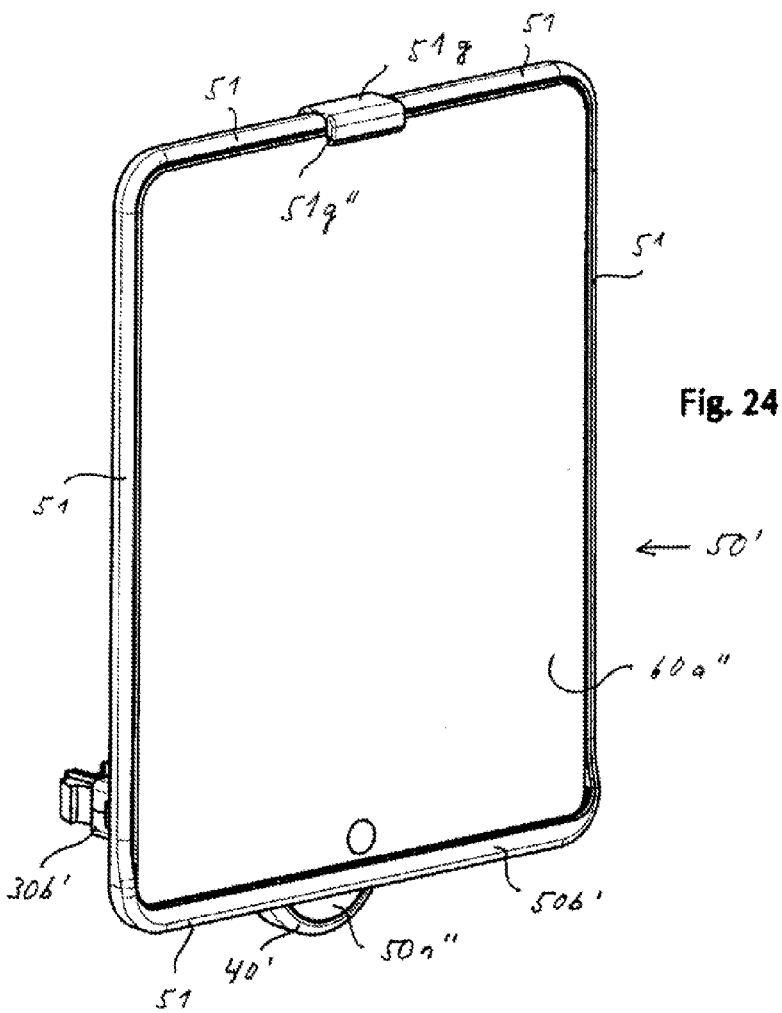
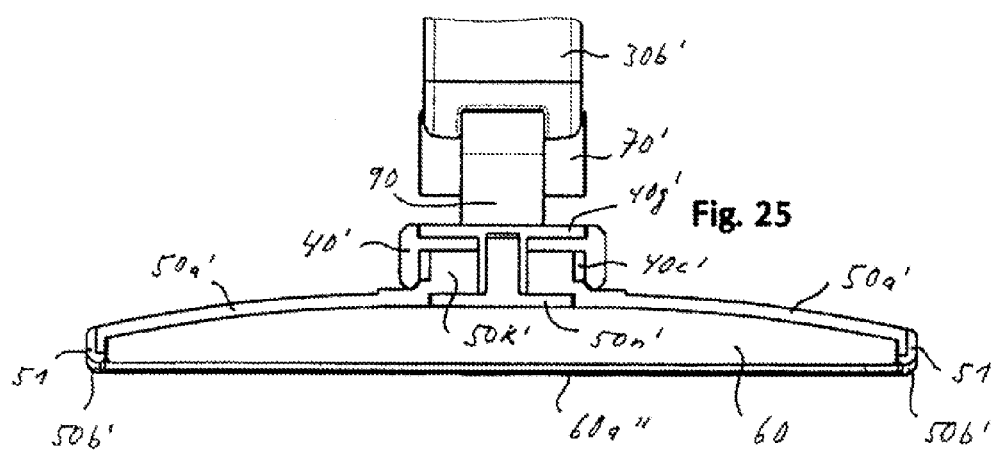

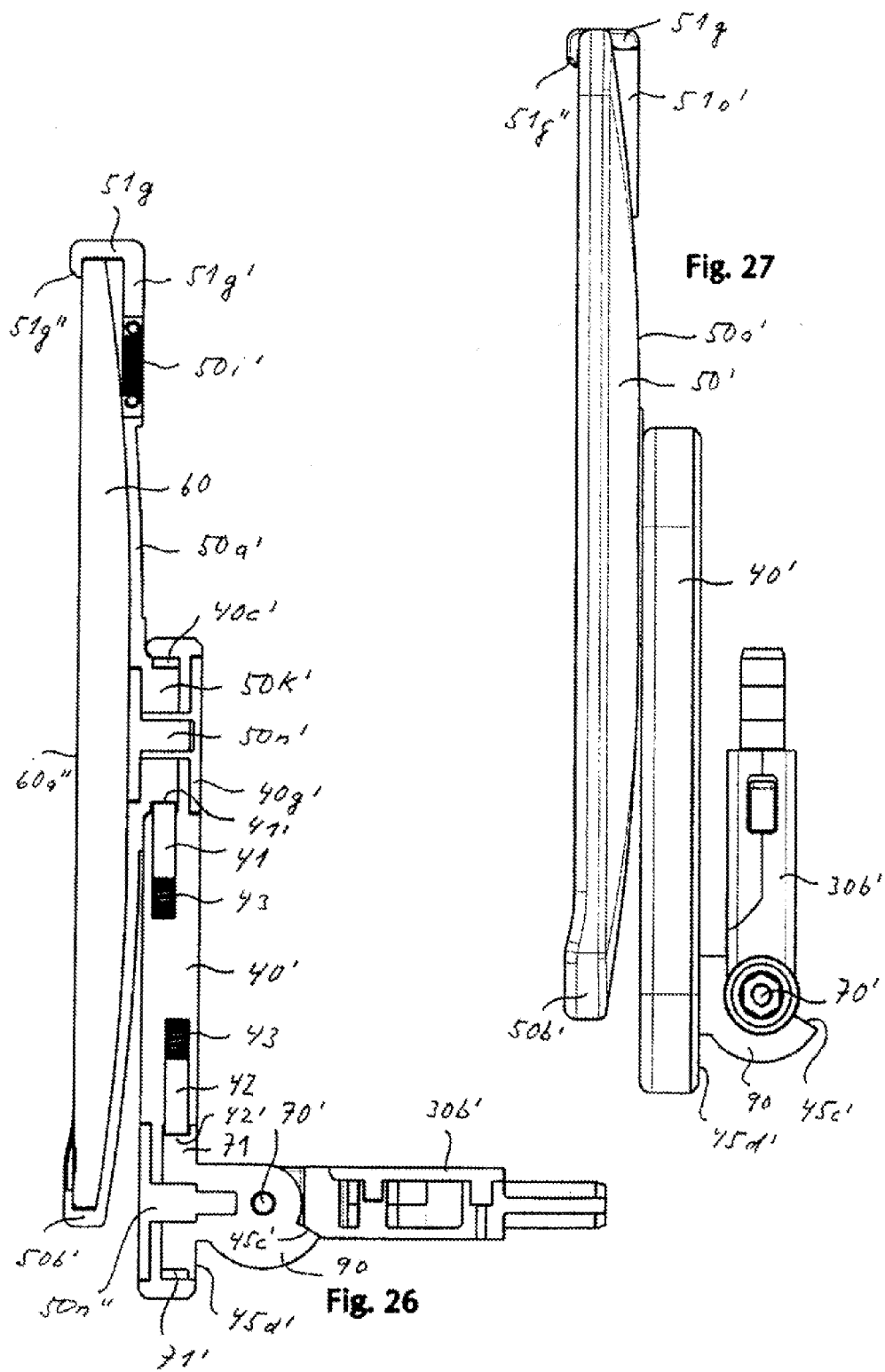

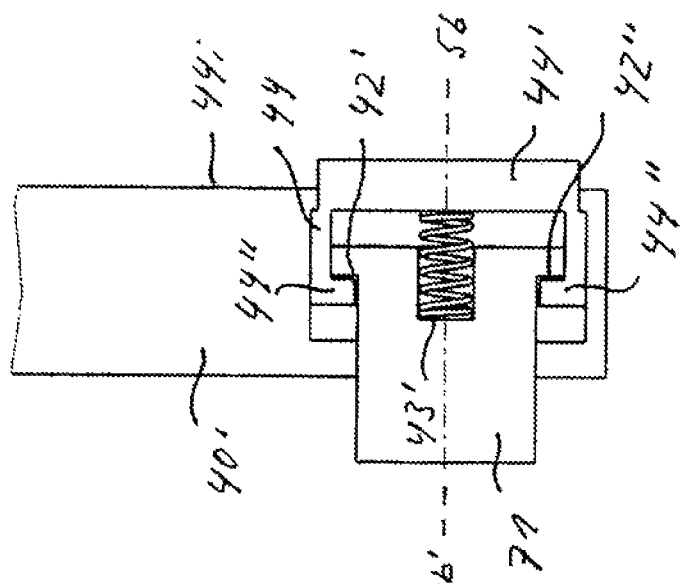
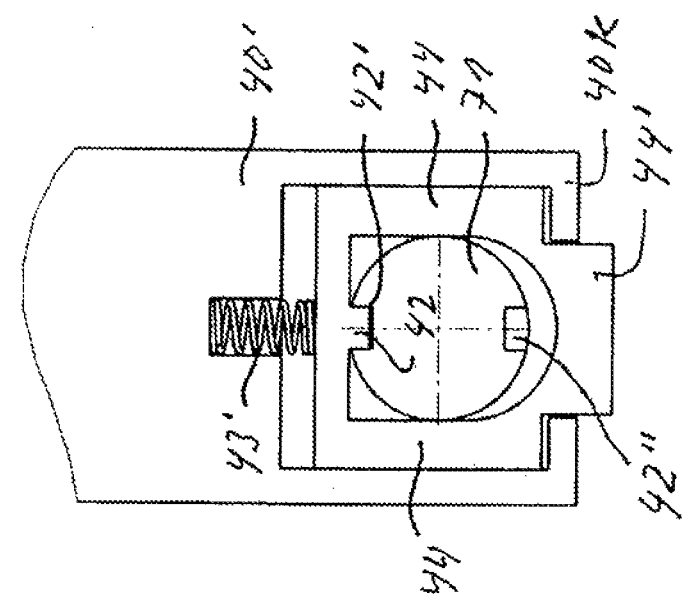

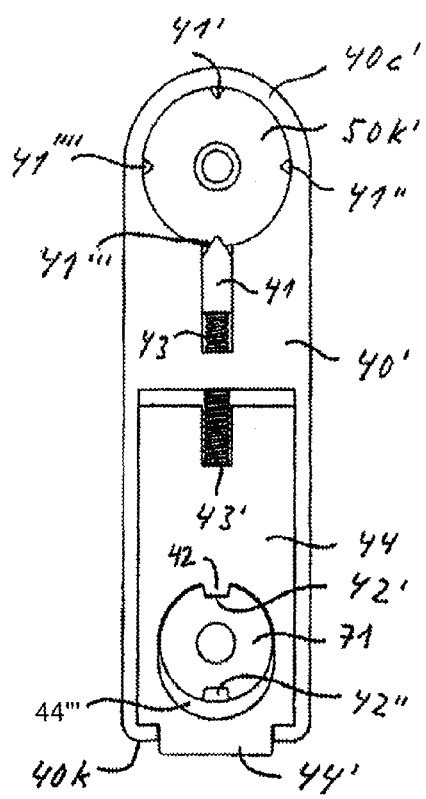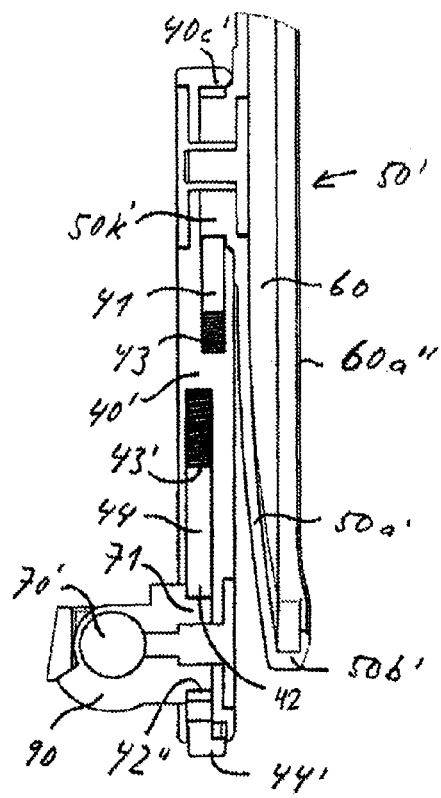
Fig. 32    Fig. 33
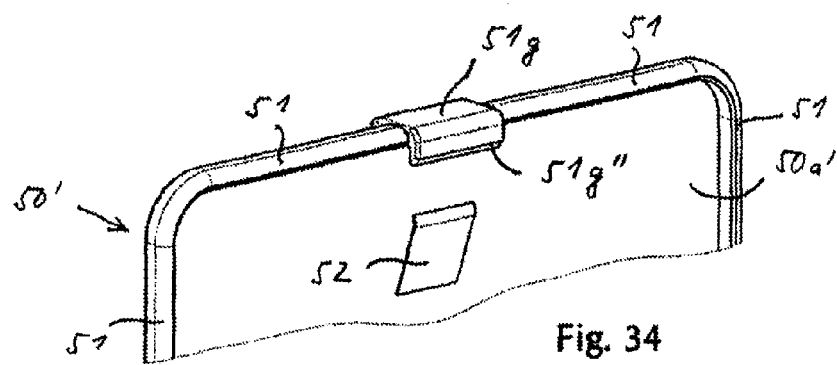
Fig. 34

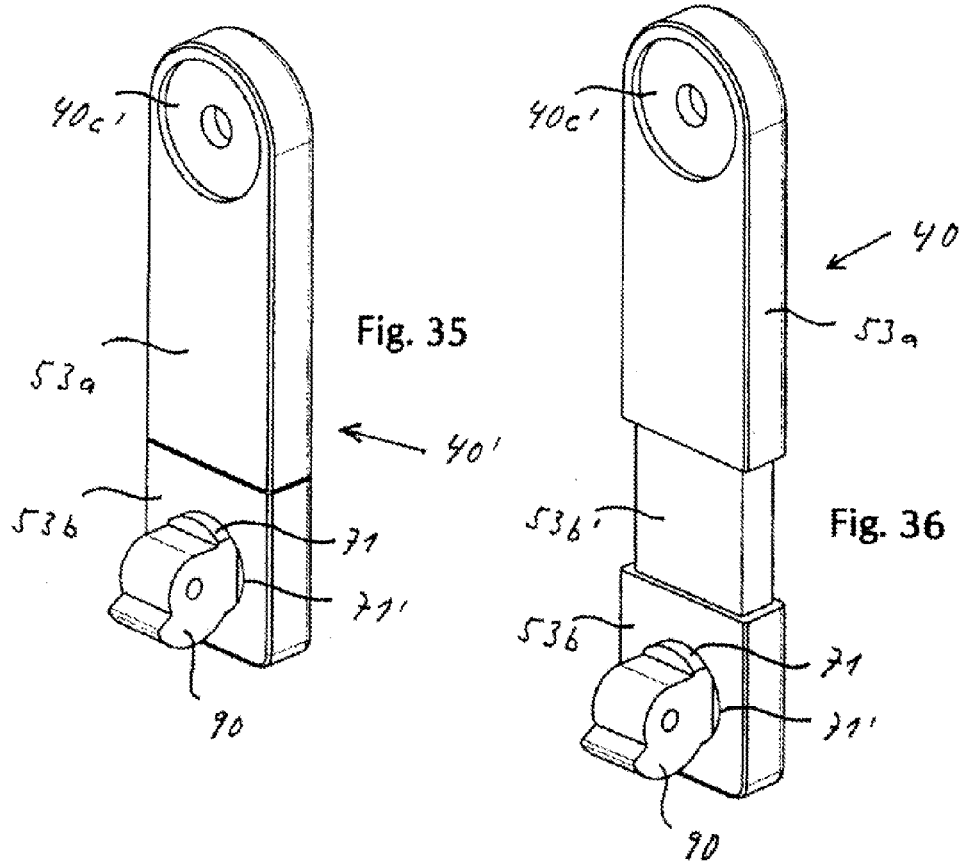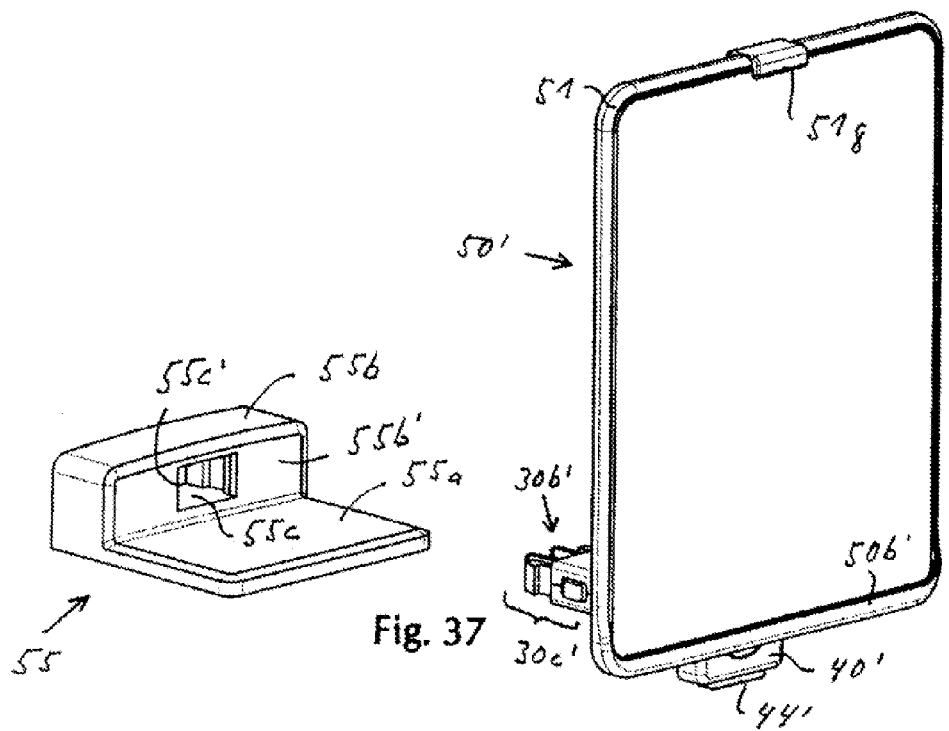

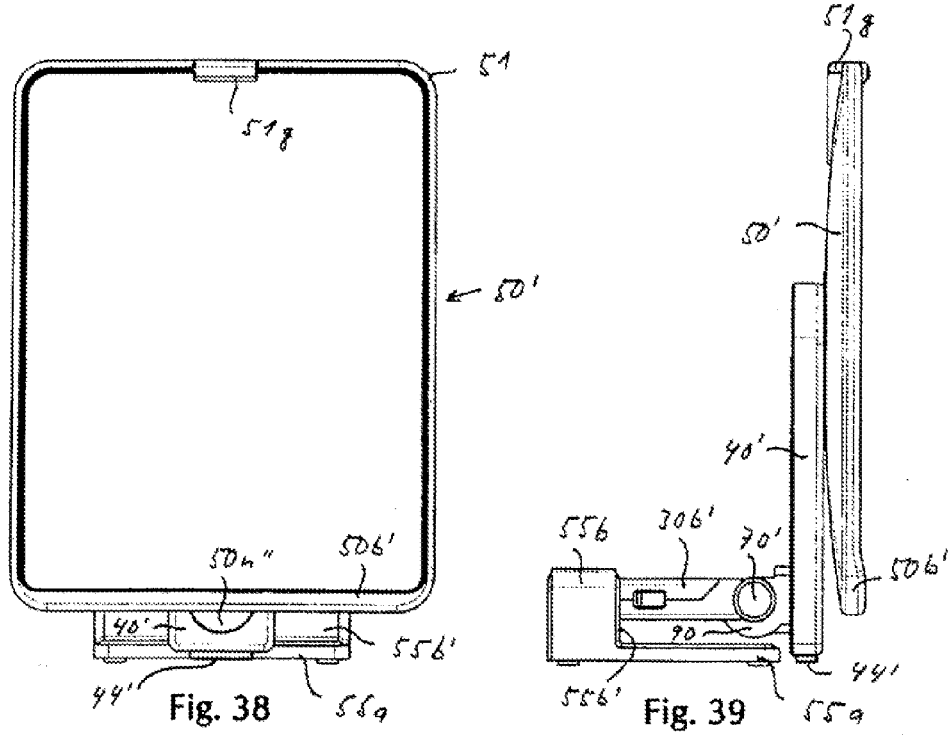
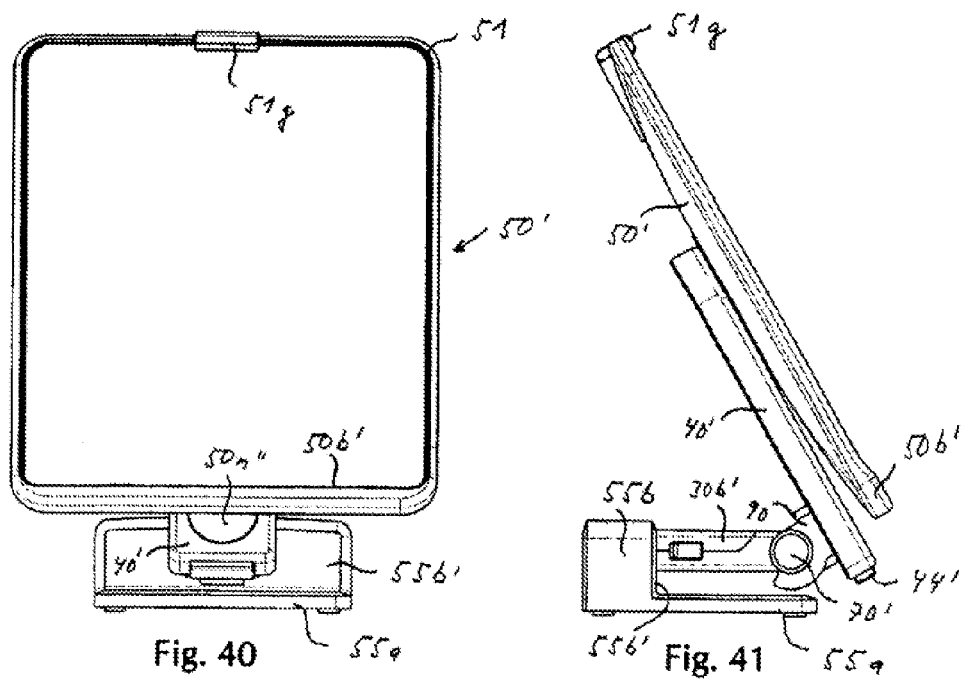

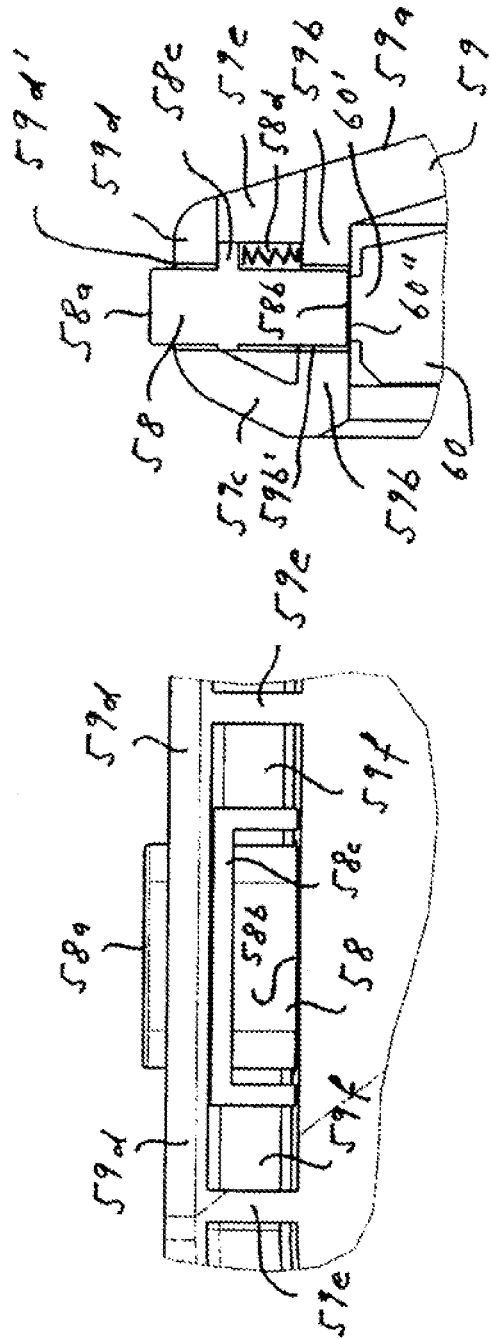

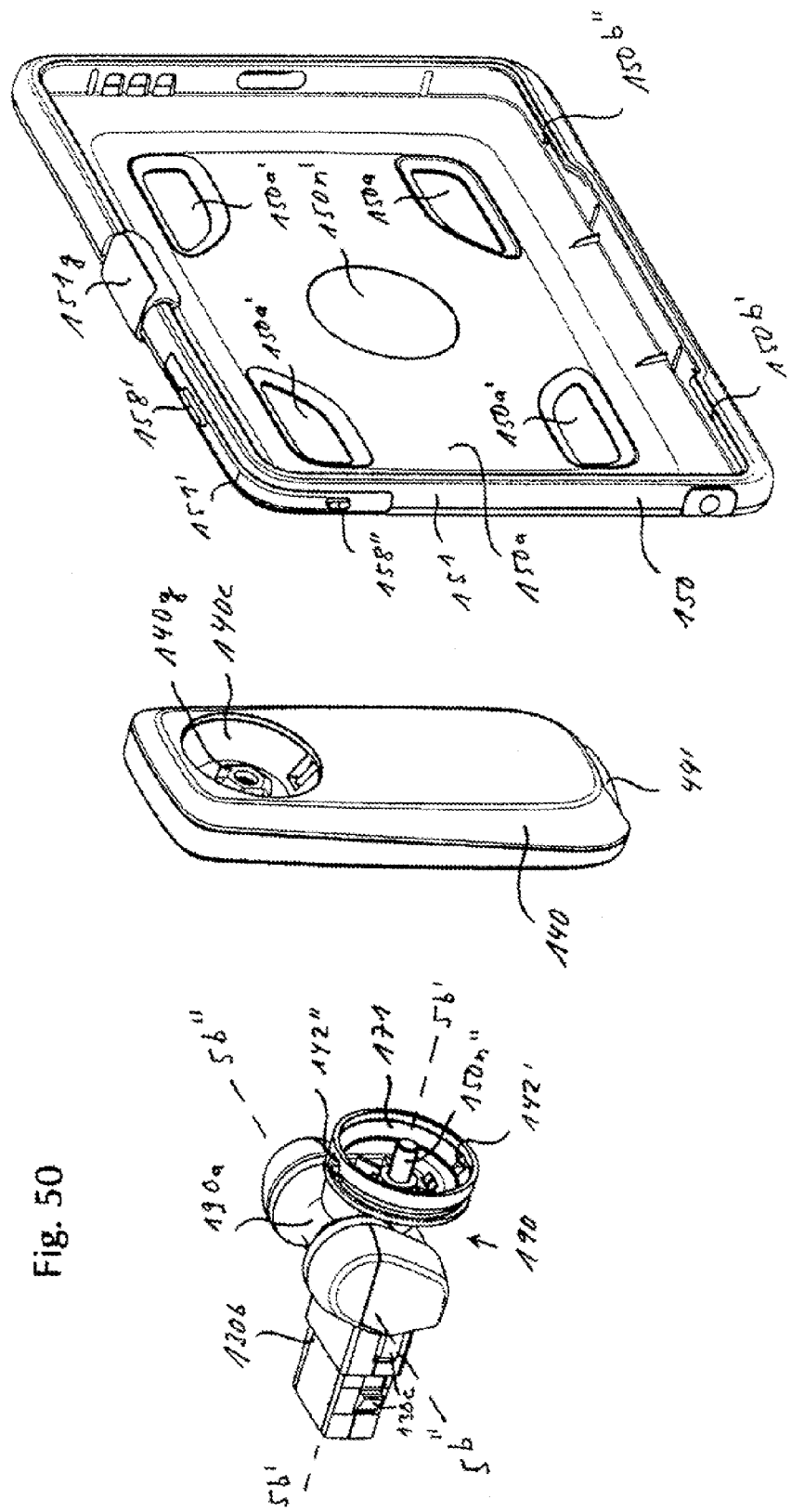

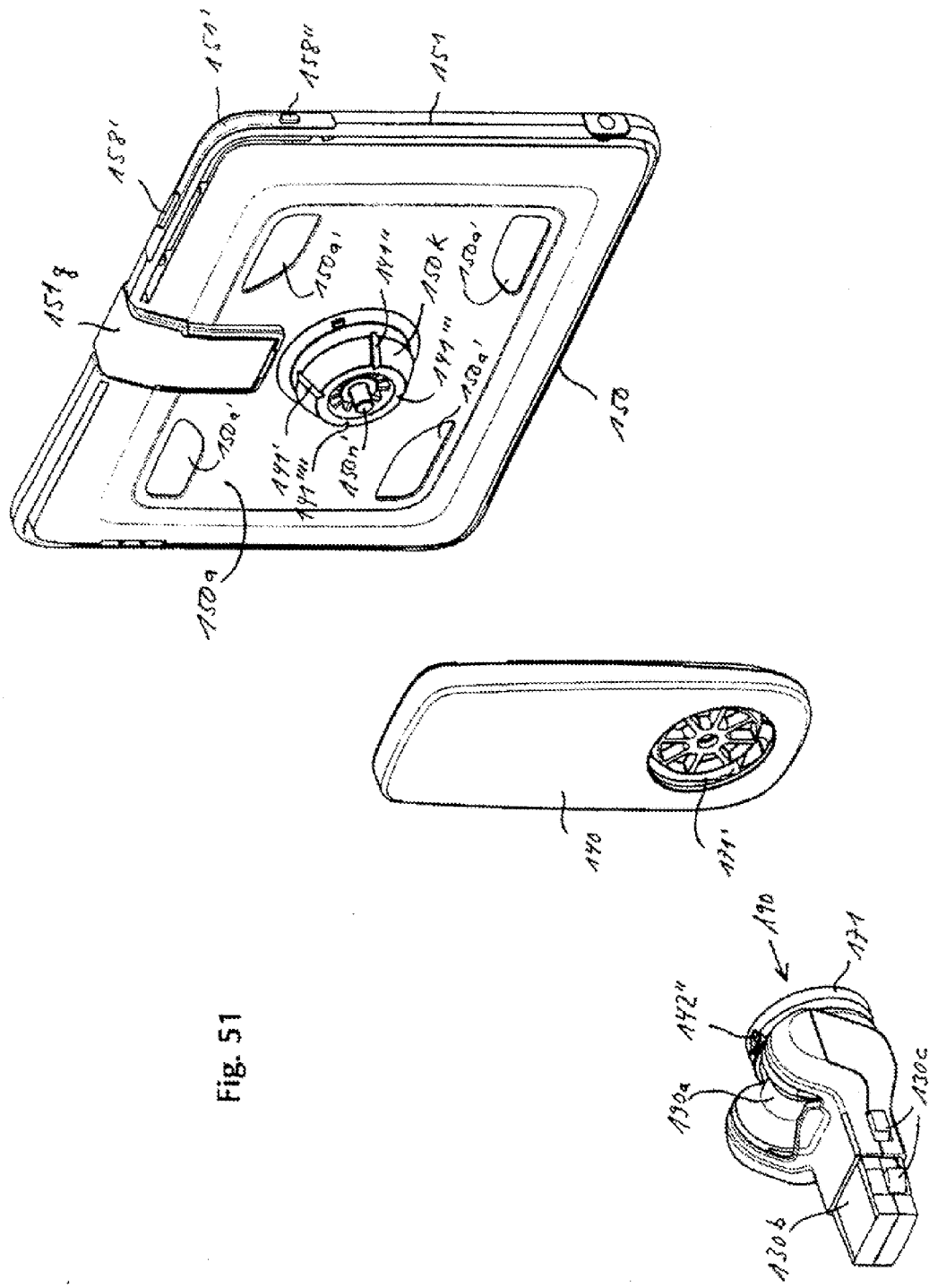

DEVICE FOR ATTACHING A TABLET COMPUTER

This application is the national stage of PCT/2011/054758 and also claims Paris convention priority of DE 10 2010 006 261.8 filed Jan. 28, 2010, DE 10 2010 020 082.4 filed May 10, 2010, DE 10 2010 021 372.1 filed May 25, 2010, DE 10 2010 024 095.8 filed Jun. 17, 2010, DE 10 2010 026 941.7 filed Jul. 12, 2010 and of PCT/EP2011/000393 filed Jan. 28, 2011 the entire disclosures of which are hereby incorporated by reference.

BACKGROUND OF THE INVENTION

The invention concerns a device for attaching a tablet computer, in particular, to the rear side of a motor vehicle seat part such as a back rest, head rest or head rest mounting of a vehicle seat.

In contrast to a notebook computer comprising a keypad and a screen block, which are connected via a joint, a tablet computer consists of one single block with integrated flat screen, on which the entries are made via automatically displayed keyboards or with an electronic stylus. The length and width of the block approximately correspond to the dimensions of the 9.7 inch screen and the thickness is slightly more than 1 cm, such that tablet computers are very light-weight, portable devices which are particularly suited for use while travelling.

Despite the very compact design, tablet computers combine a plurality of passive and interactive functions and can therefore be used in an immense variety of ways. The user can e.g. read books and newspapers, listen to music, watch TV programs and video clips, study GPS-based maps, surf on the Internet, send and receive e-mails, communicate via blogs and web forums, play computer games, and also edit photos and documents.

Tablet computers have their own current source and the data is transmitted via radio communication such that neither a power connection nor a connection for data transmission are required for operation. At the most, a power supply must be provided for charging the batteries of the device or in case of a very long period of use.

For all these reasons, tablet computers are also particularly suited for use in vehicles. In particular, during long car trips, the passengers in the backseats wish to watch films, information programs and the news on the Internet or on TV, correspond via e-mail, listen to music or entertain themselves with video games. In particular, for passive use, e.g. for watching films and information programs, it is ideal for the tablet computer to be positioned on the rear side of a front seat approximately at the height of the head rest and for the screen or tablet computer to be aligned approximately in a vertical position to the eye level of the viewer. It is also desirable for the screen or tablet computer to be optimally finely adjusted to the respective user in this passive position of use both in height and also with respect to the angle of inclination.

The position of use of the screen or tablet computer in the passive mode of viewing is, however, unfavorable for interactive use, in particular for making entries via the displayed keyboards. For this purpose, the tablet computer should rather be oriented with the screen facing upwards approximately at table height in a horizontal position or advantageously in a position inclined with respect to the user such that operation is possible in a relaxed position to prevent the user from twisting his/her wrists and fatiguing his/her arms.

In this interactive position of use, it is also desirable for the screen or tablet computer to allow optimized fine adjustment to the respective user both in height and angle of inclination.

Most of the screens have a rectangular shape and are used either in an upright format or a transverse format in dependence on the contents. For this reason, the tablet computer should be rotatable between an upright and a transverse format both in the passive position of use and also in the interactive position of use.

It is also important for the tablet computer to be stably fixed in the positions of use in order to prevent it from changing its position due to shocks, vibrations or acceleration of the vehicle.

Due to their versatility and dependence on an individual person, tablet computers are mainly only temporarily used in a vehicle, like mobile phones, such that mounting and removing thereof to and from the device that is attached to the vehicle should be realized with minimum expense when getting into and out of the vehicle.

The device with and without tablet computer must moreover not endanger the safety of the passengers or limit their freedom of movement and should be quickly and easily mounted to or removed from the vehicle seat in case it is not used.

In another advantageous fashion, the device is not only used in vehicles but also otherwise, e.g. at home or in the office.

It is the underlying purpose of the invention to produce a device for mounting a tablet computer, in particular, to the rear side of a vehicle seat, which enables use of the tablet computer with maximum versatility.

The tablet computer should also be individually adjustable to the users with respect to height and angle of inclination in both positions of use, be stably fixed, and be rotatable between an upright format and a transverse format.

The tablet computer should moreover also be insertable into and removable from the device in a simple and rapid fashion.

The device should moreover also enable easy and rapid mounting to and removal from the vehicle seat and be used elsewhere, e.g. at home or in the office.

The device with and without tablet computer should also not represent any danger for the vehicle passengers.

SUMMARY OF THE INVENTION

In accordance with the invention, these objects are achieved by a device for mounting a tablet computer to the rear side of a vehicle seat part, such as a back rest, head rest or head rest mounting of a vehicle seat comprising the features of the independent claim. Advantageous further developments of the invention are defined in the dependent claims.

The device comprises a fastening device for mounting the device to the vehicle seat part and a carrier element which is movably connected to the fastening device and to which a holder is movably connected for receiving the tablet computer, wherein the holder can be moved between a first position of use, in which the screen of the tablet computer is oriented in an approximately vertical direction facing away from the vehicle seat part, and a second position of use, in which the screen of the tablet computer is preferably oriented in an upward direction and approximately horizontally or at an inclination with respect to the user.

In the first position of use, the holder is advantageously positioned at eye level of the viewers. In another preferred variant, in the first position of use, the angle of inclination of the holder can be adjusted to the viewing angle of the users.

In the second position of use, the holder is adjustable between an approximately horizontal and an approximately vertical position. An inclined position with an inclination of approximately 30° to 60° below the horizontal is preferred.

The holder is preferably positioned in the first position of use substantially above the fastening device and in the second position of use substantially below the fastening device.

In another preferred variant, the holder can also be fixed and used in positions between the first and the second position of use.

A transfer configuration is advantageously provided for displacing the holder from the first to the second position of use and vice versa, which may be designed in different ways, wherein the screen can be aligned to the user in both positions of use.

The transfer configuration thereby comprises a carrier element designed as an arm, which is connected to the fastening device via a first joint and to the holder via a second joint, wherein the two joints rotate about axes that extend parallel with respect to each other and perpendicularly to the rear wall of the holder.

In a preferred further development of this embodiment, an additional pivot bearing is arranged between the first joint and the fastening device, the axis of rotation of which extends in a horizontal direction and parallel to the rear wall of the holder. The movement of the holder between the first and the second positions of use is therefore performed in one plane, the inclination of which is realized through pivoting of the carrier element about the pivot bearing.

The carrier element may be designed to be rigid or in two parts according to the principle of a telescopic slide guidance such that the separation between the joints can be variably adjusted.

The joints and pivot bearings are advantageously held in the respectively adjusted positions through friction or positive fit. Manually detachable locking devices are also preferred, which have a spring-loaded locking bolt and can be unlocked with a release button.

In a further preferred embodiment, ball joints may also be used instead of pivot joints. Combinations of pivot joints and ball joints are also feasible.

Moveable components such as joints and linear guides preferably have an associated locking mechanism for mutual locking thereof. The locking mechanism has an associated element for releasing the locking action.

A further preferred embodiment of the device comprises stops that delimit the angle of inclination of the holder with respect to the user at least in the two positions of use in order to prevent the passengers from being exposed to danger in case of accidents.

The combination of individual features of the described embodiments also produces advantageous embodiments of the transfer configuration.

In a preferred embodiment, the holder can be rotated through at least 90° between an upright format and a transverse format in the positions of use. In a particularly advantageous fashion, the holder can be rotated through 360°, with four locking positions of 90° each.

Towards this end, a pivot joint is advantageously provided between the carrier element and the holder, the axis of rotation of which extends perpendicularly to the broad side of the holder such that the advantageously rectangular holder can be rotated between an upright format position and a transverse format position. The pivot joint is advantageously arranged in the point of intersection of the diagonal of the broad side of the holder such that the holder remains centered with respect to the vehicle seat or its mounting position both in the upright position and in the transverse position.

Locking devices are preferably provided, which fix the holder in a vertical position for inserting and removing the tablet computer into/from the top and in the two horizontal positions, which may additionally comprise stops for delimiting the rotary movement. It is, however, also feasible to provide four locking positions such that the holder is fixed in both vertical and horizontal positions.

The holder advantageously comprises a rectangular rear wall which is directly or indirectly connected to the carrier element at the rear side, e.g. via pivot or ball joints, a guide rail or a carriage, and the size of which approximately corresponds to the dimensions of the tablet computer. The edges of the rear wall advantageously comprise supports, e.g. in the form of continuous or discontinuous end walls, for lateral retention of the tablet computer.

The holder may have a frame which extends parallel to the rear wall and surrounds the screen of a tablet computer that is inserted into the holder. A corresponding opening could be provided at one of the end faces of the holder for inserting and removing the tablet computer, or the frame may be connected to the holder via a hinge such that it can be opened for inserting or removing the tablet computer.

In one preferred embodiment, instead of a frame, only L-shaped clamps may be arranged on two opposite supporting walls, which surround the tablet computer on the sides of the screen and hold it down with respect to the rear wall, wherein one of the clamps should be movable to the outside, preferably in a spring-loaded fashion, for inserting and removing the tablet computer.

A continuous peripheral border is particularly advantageous, which approximately corresponds to the height of the edge of the tablet computer or projects past it. This border is advantageously provided with an outward safety radius and may consist of an elastic material.

In order to increase the solidity and provide large safety radii, the edge may be designed as a double-walled U that is closed on the side of the screen.

In a preferred embodiment, a concave receiving pocket is arranged on one side of the border, into which the tablet computer is disposed and is subsequently pivoted below the spring-loaded holding clamp arranged on the opposite border.

The rear wall of the holder preferably has openings to facilitate removal of the tablet computer from the rear of the holder following release of the holding clamps.

In a preferred embodiment, a spring arrangement is provided, which lifts the tablet computer when releasing the holding clamp to such an extent above the border that the tablet computer can be conveniently grasped and be removed from the holder.

In another preferred embodiment, the rear wall of the holder has recesses such that the tablet computer can be pushed from the rear out of the holder after releasing the holding clamps.

The holder advantageously comprises a plug for transmitting current and/or data, which, when the tablet computer is inserted, is coupled to a mating connector provided on the tablet computer.

In an alternative variant, only an opening may be provided at a corresponding location of the border of the holder, through which plugs for current or data can be directly coupled to the tablet computer. It would also be feasible to similarly provide an opening for the jack plug of an earphone at a corresponding location.

In order to ensure easy and convenient operation of the push-buttons that only slightly project past the end faces of the tablet computer despite a broad safety border of the holder, in one preferred embodiment of the invention, transfer buttons may be provided, which are guided in the border of the holder and transfer the pressure via a plunger, from the outside to the keys arranged on the tablet computer. The transfer buttons are advantageously returned via a separate spring which is formed on the key or can be a separate part.

The fastening device may be rigidly or movably connected to the vehicle seat part or be later mounted to a vehicle seat part by the user of the vehicle.

The inventive device is suited both for installation in a receiving space arranged on the rear side of a back rest or a head rest, and also for mounting to a corresponding fastening device which is provided or can be mounted to a back rest, a head rest or a head rest mounting.

In a preferred embodiment, a fastening device is provided for mounting the device to the columns of a head rest. This enables later installation into almost any vehicle without requiring any structural provisions on the part of the vehicle manufacturer.

The device is advantageously connected via a detachable coupling to the vehicle seat part and can be mounted to and removed from it in a simple and rapid fashion depending on the requirements. It is thereby advantageous for the device to be foldable into a compact shape for storage.

In accordance with a preferred embodiment, the coupling comprises a locating bushing into which a connector element, which can be folded out from the carrier element, can be inserted and locked.

The device also advantageously abuts the vehicle seat part as flatly as possible and minimally limits or obstructs the freedom of movement of the passengers.

In a preferred embodiment, the device may be installed in a receptacle formed on the rear side of the back rest or a head rest such that the device is accommodated in the first position of use substantially in the body of the vehicle seat part, and the screen of the tablet computer is approximately aligned with the outer side of the vehicle seat part.

For rotating the holder or the tablet computer between an upright format and a transverse format and/or for inserting and removing the tablet computer and for moving the holder or the tablet computer into the second position of use, the device or the holder may be moved to a correspondingly large extent out of the receptacle. This could be realized e.g. through extension with a linear guidance, a pivot joint or a telescopic axis of rotation.

The head rest columns, via which the head rest is connected to the back rest of the vehicle seat, are particularly suited for later assembly. In a preferred embodiment, a clamping element may be clamped between the two head rest columns, to which the device is rigidly or detachably connected.

The device is preferably fastened via a detachable coupling to a locating bushing disposed on the clamping element and to a connector element that is inserted into the locating bushing and can be locked with a locking device. In this embodiment, the first joint is advantageously arranged on the connector element.

In a further preferred embodiment variant, the device has a second fastening device which also enables use of the device outside of vehicles, for example at home or in the office. The second fastening device is advantageously designed for use of the device on a table area, and comprises an identical locating bushing for the connector element arranged on the device, such as the fastening device in the vehicle, such that the device can be coupled to the two fastening devices in the same fashion and be used both in the vehicle and at home or in the office.

A second fastening device of this type is advantageously provided with a suction holder with round rubber pad, with which the fastening device can be mounted by generating a vacuum on a table area or on a wall or a window pane.

In one preferred embodiment, a second fastening device of this type comprises a round base in which the suction holder and an eccentric lever are housed for generating the vacuum by lifting the rubber pad, and a hood that is rotatably connected to the base and houses the locating bushing. This enables additional rotational movement of the device of 360° about an axis of rotation that is aligned perpendicularly to the fastening plane.

In a further embodiment, a mounting foot of a preferably elastic material is provided, which can be mounted to the connector element of the device such that the device can also be set up on a flat base outside of vehicles in a non-displaceable fashion. The mounting foot preferably has a T-shape and has lateral supports such that the device is stably supported in an upright format and in a transverse format of the holder.

Further advantages and designs of the invention can be extracted from the description and the attached drawings.

It is clear that the features mentioned above and below can be used not only in the respectively stated combination but also in other combinations or individually without departing from the scope of the present invention.

The invention is described below by means of preferred embodiments with reference to the attached drawing.

BRIEF DESCRIPTION OF THE DRAWING

FIG. 1 shows a perspective view of a first variant of the device, mounted to a head rest mounting, in the first position of use without tablet computer and in a transverse format;

FIG. 2 shows a perspective view of the device in accordance with FIG. 1 during insertion of the tablet computer into the holder;

FIG. 3 shows a perspective view of the device in accordance with FIG. 1 with the tablet computer being inserted into the holder;

FIG. 7 shows a schematic side view of a second variant of the device in the two positions of use and in an intermediate position;

FIG. 8 shows a perspective view from the front of the second variant of the device in accordance with FIG. 7 with the holder without tablet computer in an upright format;

FIG. 9 shows a perspective view from the rear of the device in accordance with FIG. 8 with separate assembly consisting of carrier element with guide rail and carriage with folded-out connector element;

FIG. 10 shows a perspective view of the device according to FIG. 9 in the assembled state with the carriage with extended connector element in the lowermost position;

FIG. 11 shows a perspective view of the device in accordance with FIG. 10 with the carriage and folded-out connector element in the uppermost position;

FIG. 12 shows a perspective view of the device according to FIGS. 10 and 11 with the carriage with folded-out connector element in the center position and the holder in a transverse format;

FIG. 13 shows a perspective view of the device according to FIG. 10 with folded-in connector element in the storage position;

FIG. 17 shows a partially cut side view of an inventive device in the first position of use;

FIG. 18 shows the device in accordance with FIG. 17 in a partially cut view from the rear in both positions of use;

FIG. 19 shows a perspective view of the device according to FIG. 17 from the rear;

FIG. 20 shows a partially sectional side view of a fourth variant of the inventive device in the storage position;

FIG. 21 shows the device according to FIG. 20 in the first position of use;

FIG. 22 shows the device according to FIGS. 20 and 21 in the second position of use;

FIG. 24 shows a perspective view of the holder of the device in accordance with FIG. 23 with inserted tablet computer;

FIG. 25 shows a partially cut-free cross-section of the device in accordance with FIGS. 23 and 24 with inserted tablet computer;

FIG. 26 shows a partially cut-free longitudinal section of the device in accordance with FIGS. 23 through 25 with inserted tablet computer;

FIG. 27 shows a side view of the device in accordance with FIGS. 23 through 26 with inserted tablet computer and folded-in connector element;

FIG. 30 shows a longitudinal section from the front of a first alternative locking device of the lower joint of the device in accordance with FIGS. 23 through 29;

FIG. 31 shows a longitudinal section from the side of a second alternative locking device of the lower joint of the device in accordance with FIGS. 23 through 29;

FIG. 32 shows a longitudinal section from the front of a modified embodiment of the locking device in accordance with FIG. 30;

FIG. 33 shows a longitudinal section from the side of the locking device in accordance with FIG. 32;

FIG. 34 shows a section of the holder with the holding clamp in accordance with FIG. 24 and an ejector spring for the tablet computer;

FIG. 35 shows an alternative design of the carrier element in accordance with FIGS. 23 through 29 in a first position;

FIG. 36 shows the carrier element in accordance with FIG. 35 in a second position;

FIG. 37 shows a perspective view of the device with a fastening device for use of the device outside of vehicles in the non-coupled state;

FIG. 38 shows a front view of the device in accordance with FIG. 37 in the coupled state with the holder in the first position of use;

FIG. 39 shows a side view of the device according to FIG. 38;

FIG. 40 shows a front view of the device according to FIG. 38 with the holder being inclined towards the fastening device;

FIG. 41 shows a side view of the device according to FIG. 40;

FIG. 48 shows a section of the border of the holder with a transfer button from the rear side;

FIG. 49 shows a cross-section of the view in accordance with FIG. 48 with a tablet computer that is inserted into the holder;

FIG. 50 shows an exploded view of the assemblies: holder, carrier element and intermediate piece with connector element of a modified embodiment of the third variant of the inventive device according to FIGS. 17 through 19 and 23 through 29 from the front.

FIG. 51 shows an exploded view of the assemblies: holder, carrier element and intermediate piece with connector element in accordance with FIG. 50 from the rear;

DESCRIPTION OF THE PREFERRED EMBODIMENT

Figure 4:
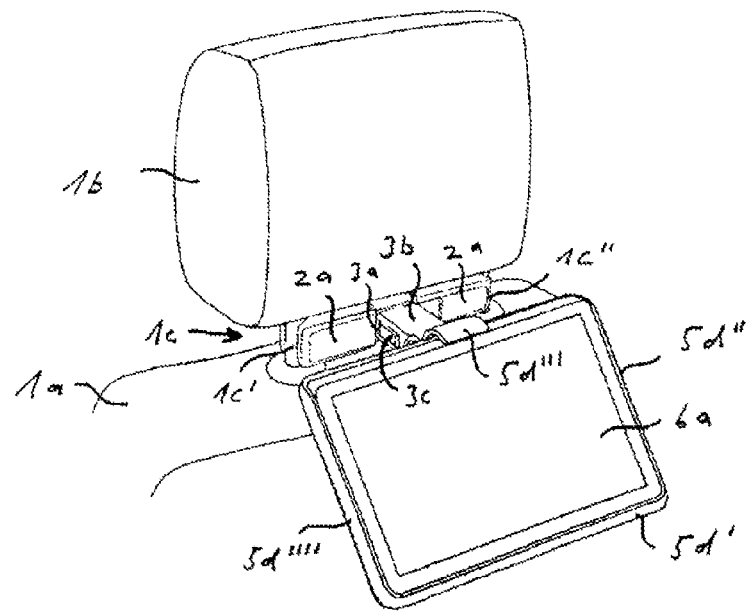
FIG. 4 shows a perspective view of the device in accordance with FIG. 3 in the second position of use.

FIGS. 1 through 6 show a first variant of the device with a first embodiment of the transfer configuration. The height-adjustable head rest 1*b* with head rest columns 1*c'*, 1*c"* is mounted to the back rest 1*a* of the vehicle seat 1. A spring-loaded clamping element 2*a* is inserted between the head rest columns 1*c'*, 1*c"*. A locating bushing 3*a* is arranged in the center of the clamping element 2*a*, into which a connector element 3*b* is inserted and locked in the locating bushing 3*a* by a locking device 3*c* that can be released via lateral buttons.

A first joint 7 is arranged at the rear end of the connector element 3*b*, to which joint one end of a carrier element 4 is hinged. At the other end of the carrier element 4, a rear wall 5*c* of a holder 5 is connected via a second joint 8 to the carrier element 4. The axes of the first joint 7 and the second joint 8 extend parallel to the rear broad side of the back rest 1*a* or the head rest 1*b*.

A pivot joint 5*a* is arranged between the second joint 8 and the rear wall 5*c* of the holder 5, the axis of rotation 5*b* of which extends perpendicularly to the broad side of the rear wall 5*c*. The pivot joint 5*a* is arranged in the point of intersection of the diagonals of the rear wall 5*c*, such that the holder 5 can be rotated between an upright format and a transverse format and maintains central alignment with respect to the vehicle seat 1. Release of the device is thereby not required.

The first joint 7 and the second joint 8 are designed as friction hinges such that the respective settings of the carrier element 4 and of the holder 5 are maintained.

Figure 6:
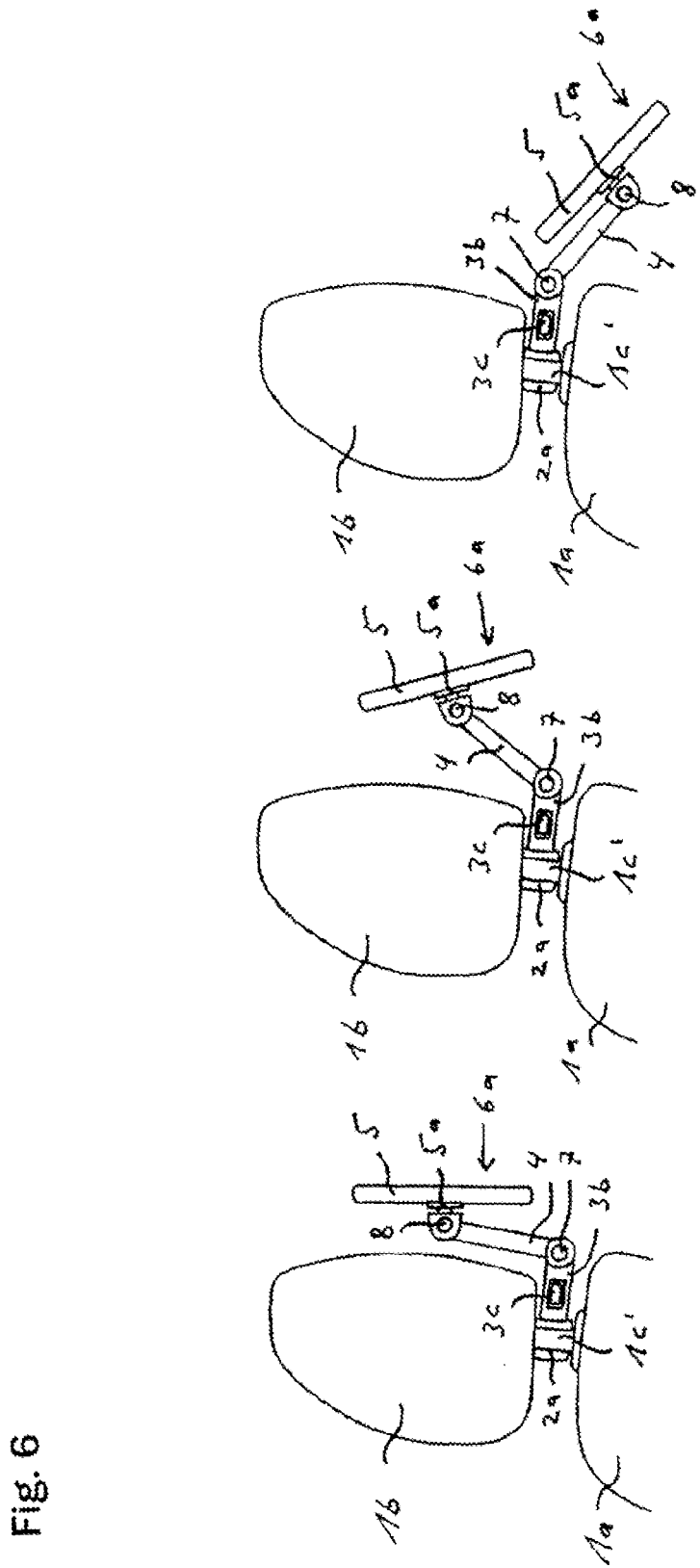
FIG. 6 shows a schematic side view of the device in accordance with FIGS. 1 through 5 in the two positions of use and in an intermediate position.

FIG. 6 schematically shows the device in three different positions. The first view shows the holder 5 in the first position of use. The view in the middle shows an intermediate position of the holder 5 and the last view shows the holder 5 in the second position of use.

FIG. 1 shows the structure of the holder 5. The supports 5*d'''* and 5*d''''* in the form of side walls, which are arranged at right angles, are mounted to the two short front edges of the rectangular rear wall 5*c*. At the long lower front edge (FIGS. 1 and 2), the support 5*d'* is designed as an L-shaped side wall and forms together with the supports 5*d''* and 5*d''''* a pocket into which the tablet computer 6 is put during insertion into the holder 5 and can then be pivoted towards the rear wall 5*c*. The supports 5*d''*, 5*d''''* thereby laterally center the tablet computer 6 such that, during insertion into the holder 5, the connector 5*f* that is arranged in the center on the inner side of the support 5*d'* for transmitting current and/or data is coupled to the mating connector arranged on the tablet computer 6.

The clamp-shaped support 5*d'''* is arranged at the front edge of the rear wall 5*c* opposite to the support 5*d'*, is pressed by a spring (not illustrated) against the tablet computer 6, and can be drawn past the edge of the rear wall 5*c* for pivoting the tablet computer 6.

FIG. 7 shows a second variant of the with a second embodiment of the transfer configuration, in which the carrier element 4 comprises a carriage 4*a* connected to the first joint 7, which forms a linear guidance together with a guide rail 5*g* arranged on the holder 5, the linear guidance displacing the holder 5 relative to the first joint 7. The first view shows the holder 5 in the first position of use. The center view shows an intermediate position of the holder 5 and the last view shows the holder 5 in the second position of use.

Figure 5:
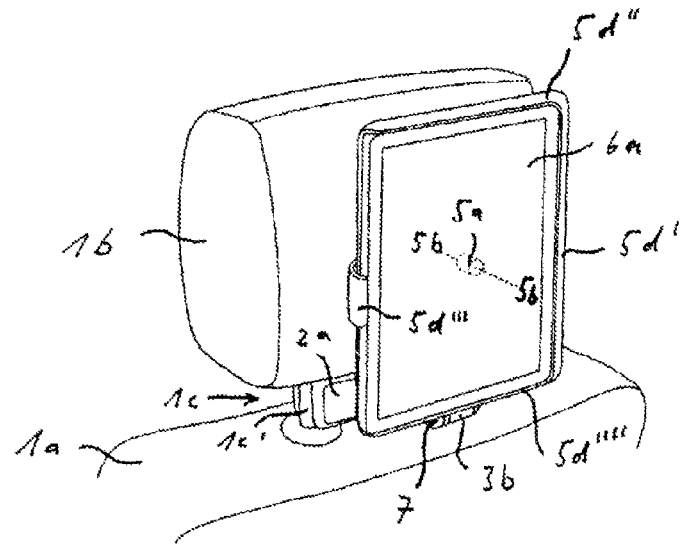
FIG. 5 shows a perspective view of the device in accordance with FIG. 3 with the tablet computer in the first position of use in an upright format.

The first joint 7 is also designed as a friction hinge in this second variant such that the respective setting of the holder is maintained. A pivot joint 5*a* is also arranged between the carrier element 4 and the rear wall 5*c* of the holder 5, the axis of rotation 5*b* of which extends perpendicularly to the broad side of the rear wall 5*c* (FIG. 5).

FIGS. 8 through 16 show detailed views of the second variant of the device in accordance with FIG. 7. The joint bearing 45*b* of the carriage 45 is connected via the joint 70 to the connector element 30*b*. The carrier element 40' comprises a guide rail 40*a* in which the sliding plate 45*a* of the carriage 45 is movably and linearly guided, wherein the displacement path is limited by the end stops 40*a''* (FIGS. 10 and 11).

Figure 14:
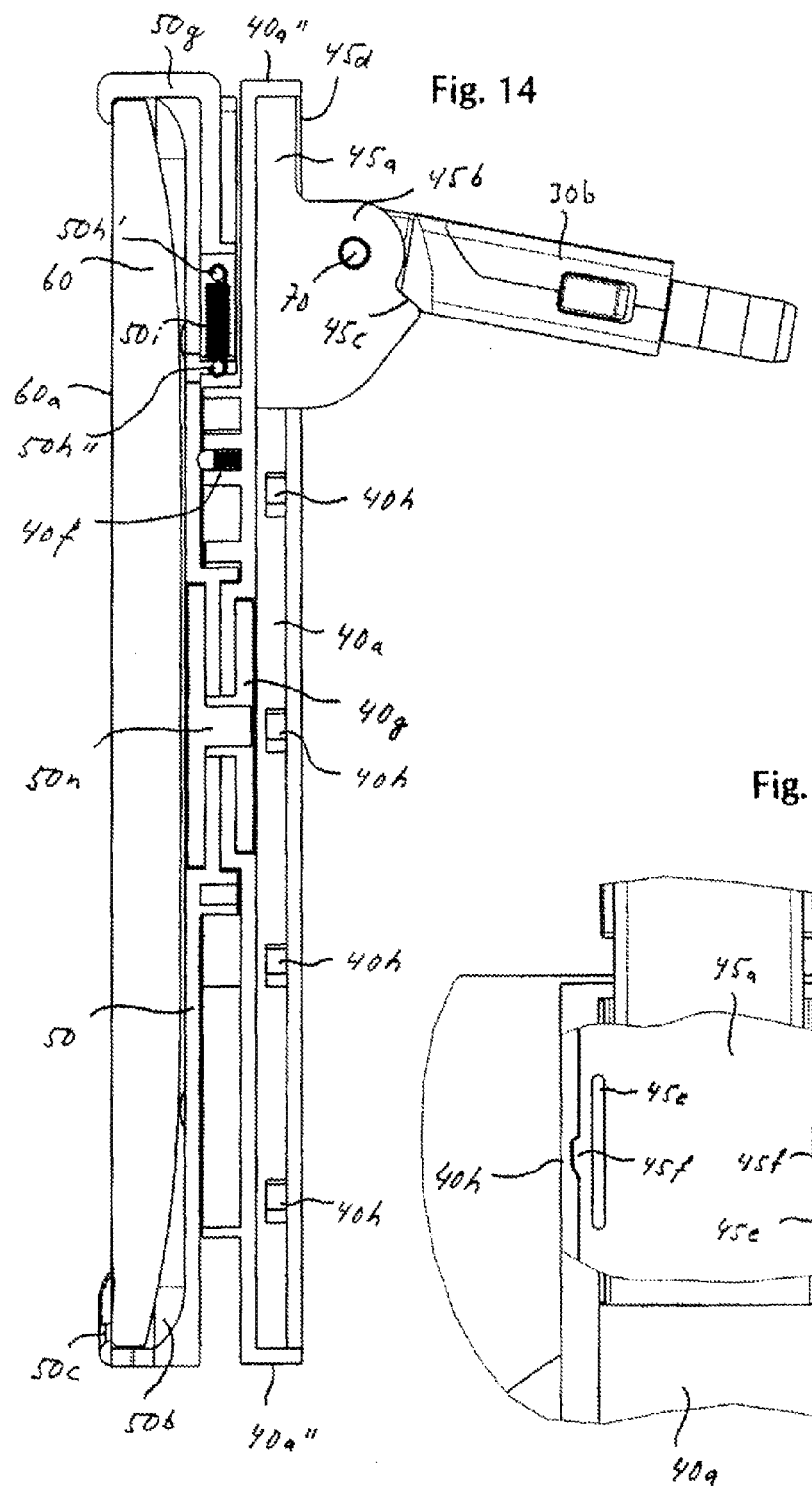
FIG. 14 shows a longitudinal section through the device in accordance with FIG. 11 with the tablet computer being inserted into the holder.
Figure 15:
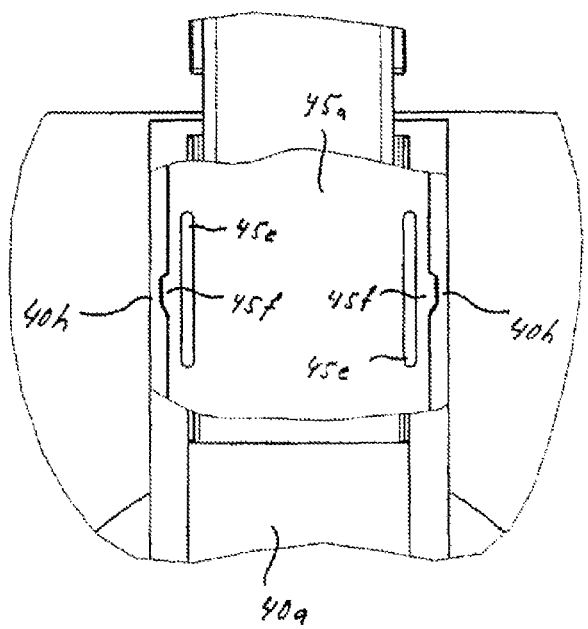
FIG. 15 shows a partially cut-free detailed view of the carriage guidance in the carrier element of the device according to FIG. 14.
Figure 16:
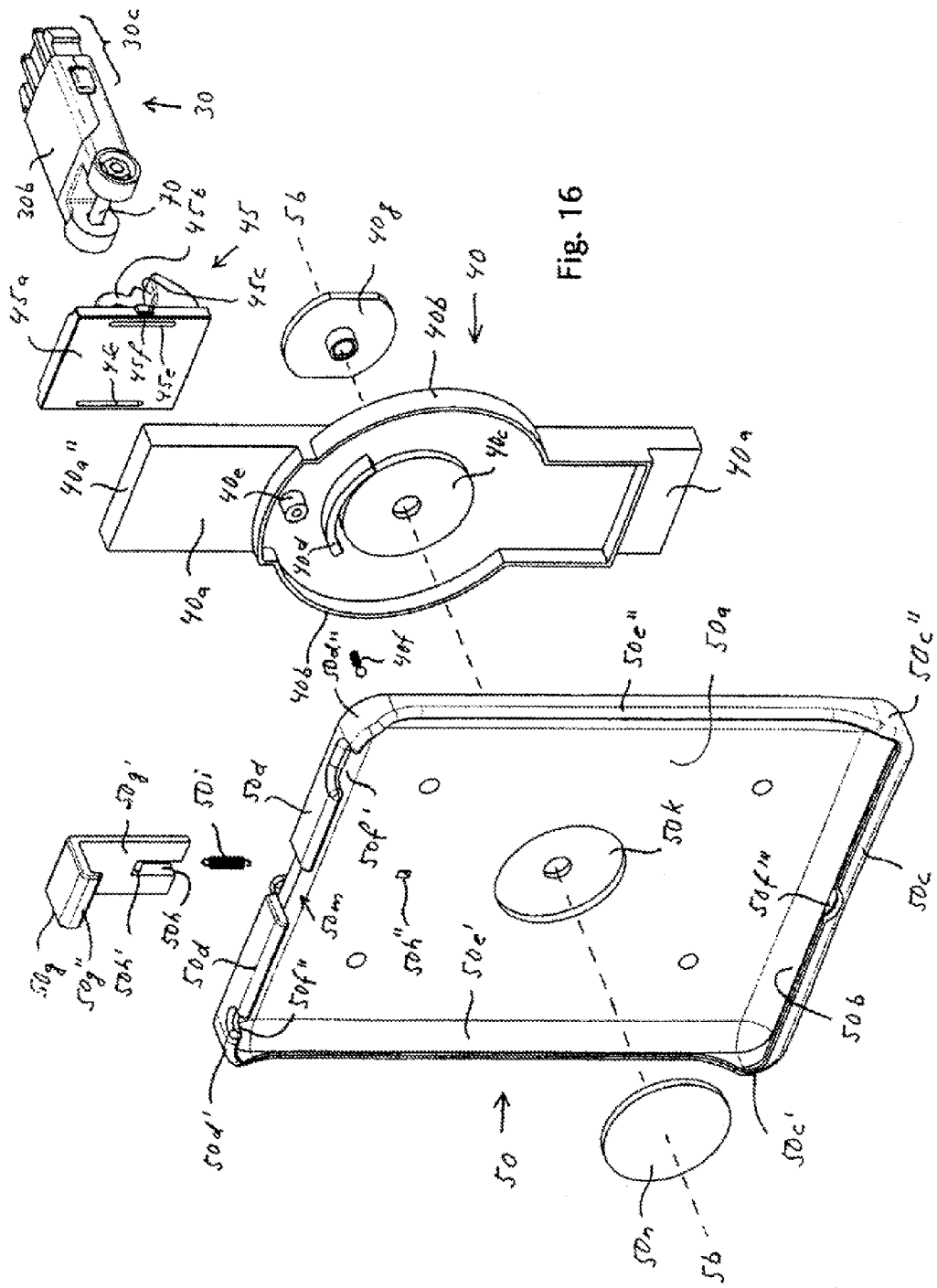
FIG. 16 shows a perspective exploded view of the device in accordance with FIGS. 8 through 15.
Figure 23:
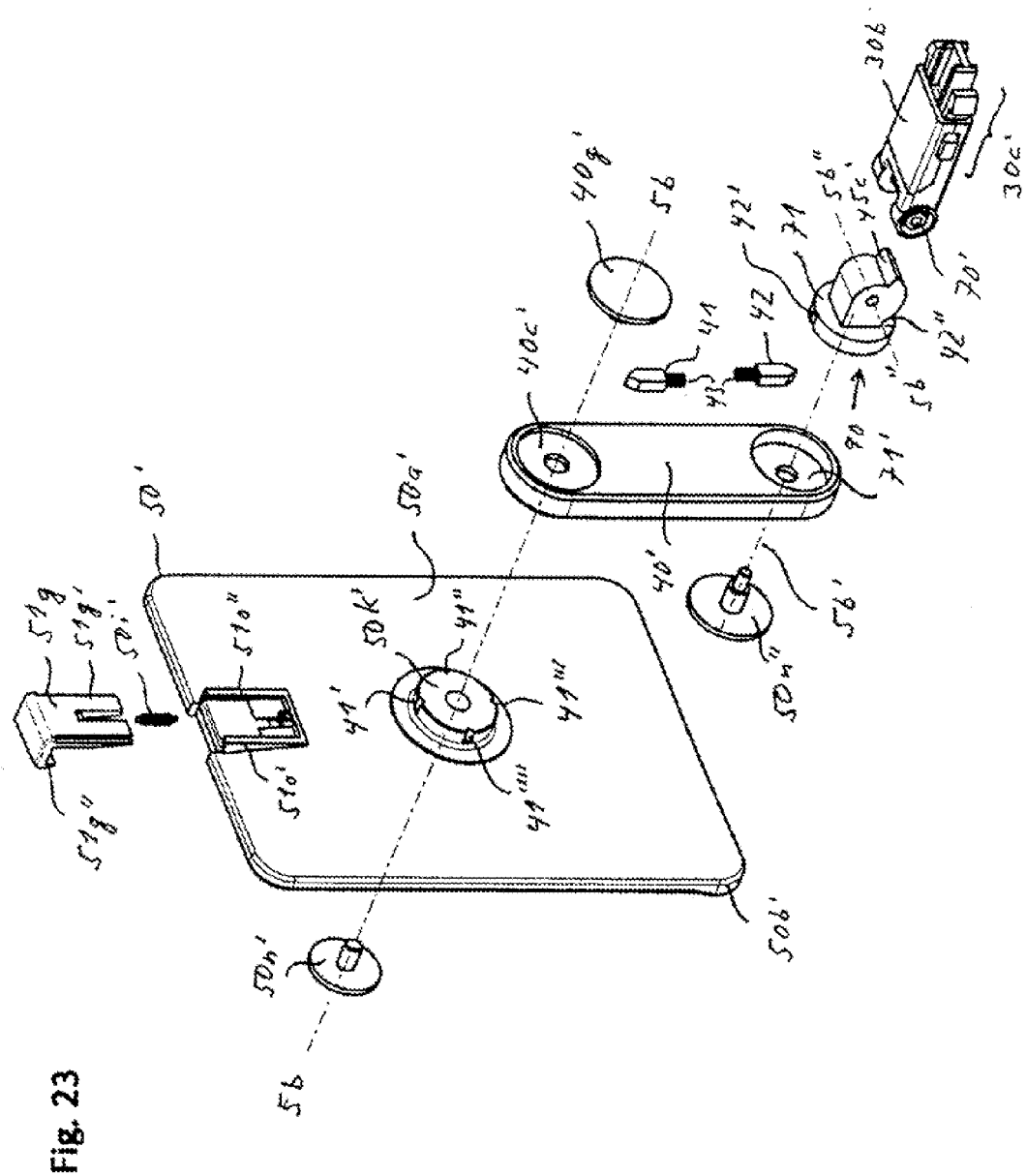
FIG. 23 shows an exploded view of a modified embodiment of the third variant of the inventive device in accordance with FIGS. 17 through 19 with inserted tablet computer.
Figure 28:
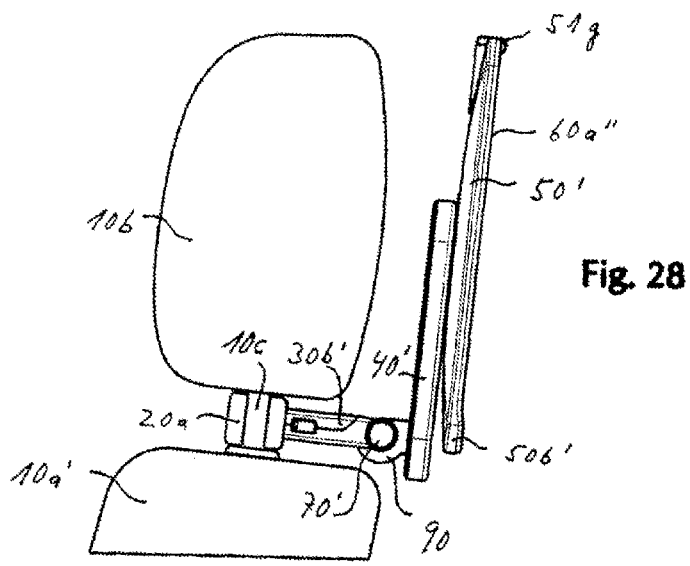
FIG. 28 shows a side view of the device mounted to a head rest mounting in accordance with FIGS. 23 through 27 with inserted tablet computer in the first position of use.
Figure 29:
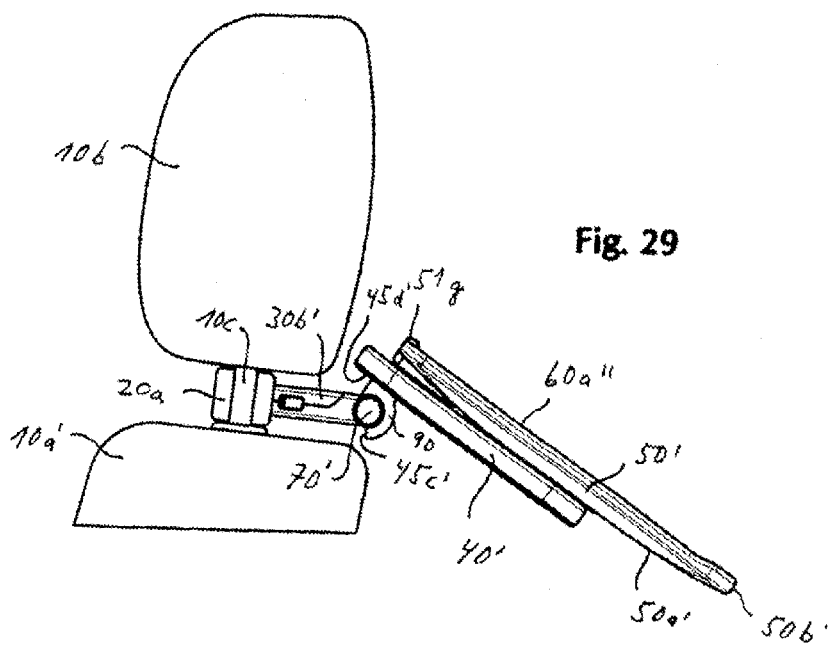
FIG. 29 shows the device according to FIG. 28 in the second position of use.
Figure 42:
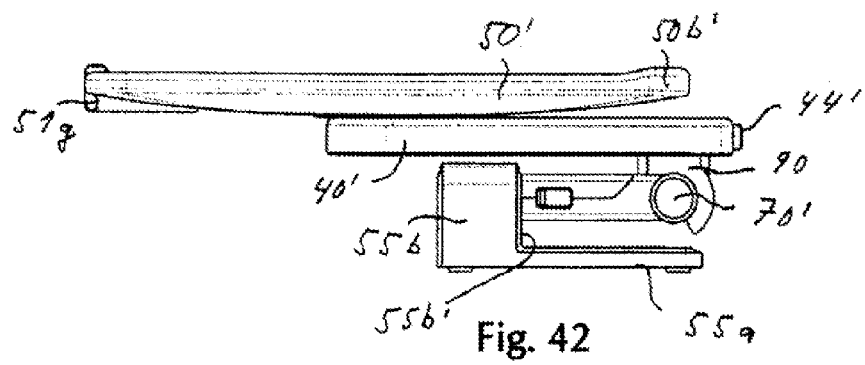
FIG. 42 shows a side view of the device according to FIG. 41 with the holder being horizontally supported on the fastening device.
Figure 43:
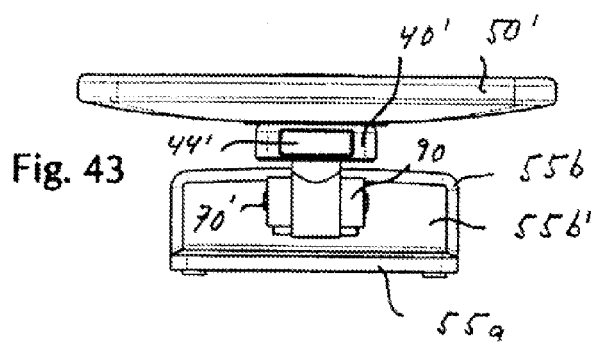
FIG. 43 shows a front view of the device according to FIG. 42.
Figure 44:
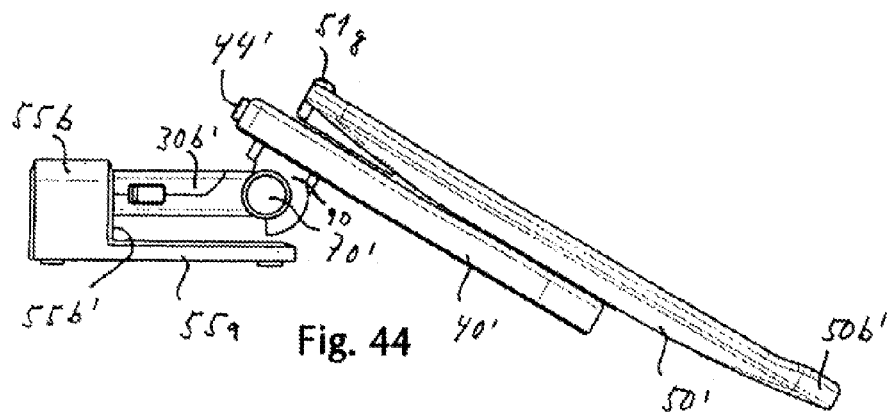
FIG. 44 shows a side view of the device according to FIGS. 38 through 43 with the holder in the second position of use.

Locking recesses 40*h* are arranged on the inner sides of the two side walls of the guide rail 40*a*, into which locking cams 45*f* engage, which are laterally connected to the sliding plate 45*a* via spring elements 45*e* and retain the carriage 45 with positive fit. During displacement of the carriage, the spring-loaded locking cams 45*f* act between the locking recesses 40*h* as brakes by means of frictional locking (FIGS. 14 and 15).

The first bearing seat 40*c* is arranged in the center of the guide rail 40*a* and forms together with the second bearing seat 50*k*, which is arranged in the center on the rear wall 50*a* of the holder 50, the pivot joint 5*a* that rotates about the axis of rotation 5*b*. The two bearing seats 40*c*, 50*k*, and thereby the carrier element 40 and the holder 50, are held together by the connecting pin 50*n* that is snapped with the connecting sleeve 40*g*. The pivot joint 40*c*, 50*k*, 40*g*, 50*n* is covered by the joint cover 40*b* which is concentrically mounted to the guide rail 40*a* and laterally projects past the guide rail 40*a* and stably supports the holder 50 and the carrier element 40 with respect to one another during rotation of the holder 50. An arc-segment shaped stop 40*d* is arranged concentrically with respect to the first bearing seat 40*c* and an arc-segment shaped counter stop 50*l* is arranged concentrically with respect to the second bearing seat 50*k*, the arc lengths of which correspond to a central angle of 90° and which are opposite to each other when the holder 50 and the carrier element 40 are vertically aligned such that the holder 50 can be rotated with respect to the carrier element 40 from the vertical position to both sides through 90° to each side.

A receiving sleeve 40*e* is disposed vertically above the axis of rotation 5*b* on the side of the guide rail 40*a* facing the holder 50, into which a spring-loaded ball catch 40*f* is inserted. On the side of the rear wall 50*a* facing the carrier element 40, three hollows 50*p'*, 50*p''*, 50*p'''* are mounted into which the ball catch 40*f* locks in the vertical and both horizontal positions of rotation of the holder 50 and fixes the holder in the respective positions.

The length of the guide rail 40*a* corresponds to the height of the rectangular holder 50 in its vertical position in the upright format. When the holder is pivoted into the horizontal position to a transverse format, the guide rail 40*a* symmetrically projects past the holder 50 at the top and bottom (FIG. 12).

The pivoting angle of the guide rail 40*a* about the first joint 70 is delimited by the two stops 45*c*, 45*d* on the carriage 45. The first stop 45*c* is used to delimit the inclination of the holder 50 or of the tablet computer 60 with respect to the user in the first position of use, whereas the inclination of the holder 50 or tablet computer with respect to the user in the second position of use is delimited by the second stop 45*d* on the sliding plate 45*a* (FIG. 14). In both positions of use, the holder 50 can freely move away from the user towards the vehicle seat part 10*a*, 10*b*.

The connector element 30*b* can be stored using little space by pivoting it around the first joint 70 into the guide rail 40*a* (FIG. 13).

Upper 50*d*, 50*d'*, 50*d''* and lower 50*c*, 50*c'*, 50*c''* supports for the tablet computer 60 are arranged on the rear wall of the holder 50 at the opposite narrow end faces. The lower supports 50*c*, 50*c'*, 50*c''* form together a concave receptacle 50*b* into which the tablet computer is inserted at an inclination from the front and is then pivoted below the upper supports 50*d*, 50*d'*, 50*d''*.

A recess 50*m* for the L-shaped holding clamp 50*g* is provided in the center of the upper support 50*d*, which can be guided with the guiding leg 50*g* in clamp guidances 50*o'*, 50*o''* on the rear wall 50*a* and can be displaced parallel thereto. An opening 50*h* is provided in the center of the clamp leg 50*g'*, which accommodates a tension spring 50*i* which is mounted to the spring suspensions 50*h'* 50*h''* and pretensions the holding clamp against the end face of the tablet computer 60 that is inserted into the holder 50.

An inlet slope 50*g''* is provided at the front edge of the holding clamp such that the holding clamp 50*g* is forced in an upward direction during pivoting of the tablet computer and subsequently extends over the front side of the tablet computer.

In the corner areas, the tablet computer is laterally held by the supports 50c', 50c'', 50d', 50d''. The side walls 50e', 50e'' of the holder have no supporting function and are below the end faces of the tablet computer 60 which remains freely accessible from the side.

Cut-outs 50f', 50f'', 50f''' are provided on the upper 50d and lower 50b, 50c supports, which ensure accessibility to the control elements of the tablet computer.

FIGS. 17 to 19 show a third variant of the inventive device with a third embodiment of the transfer configuration. The carrier element 40' is connected via a lower joint 71, 71' to the connector element 30b' and via an upper joint 40c', 50k' to the holder 50', wherein the axes of rotation 5b, 5b' of the two joints 71, 71', 40c', 50k' extend perpendicularly to the rear wall 50a' of the holder 50' and parallel to each other. The movement of the holder 50' between the first and the second position of use is therefore performed in one plane, the inclination of which is realized through pivoting the carrier element 40' about the first joint 70'.

In the first position of use of the holder 50', the longitudinal axis of the carrier element 40' extends from the lower joint 71, 71' in a vertical upward direction and the upper joint 40c', 50k' is located perpendicularly above the lower joint 71, 71' (FIG. 18).

In the second position of use (dashed lines) of the holder 50', the longitudinal axis of the carrier element 40' extends from the lower joint 71, 71' in a vertical downward direction and the upper joint 40c', 50k' is located perpendicularly below the lower joint 71, 71' (FIG. 18).

The first and the second positions of use of the holder 50' or tablet computer 60 are defined by two corresponding stops or locking positions (not shown) on the lower joint 71, 71', and the positions of rotation of the holder or tablet computer 60 in the upright and transverse formats are defined by four corresponding stops or locking positions (not shown) at the upper joint 40c', 50k', whereas the inclination of the holder or tablet computer is adjusted at the first joint 70'.

FIGS. 20 to 22 show a fourth variant of the device with a fourth embodiment of the transfer configuration. A receiving space 10d is formed in a vehicle seat part 10a, the bottom wall 10d' of which has a fastening device 20 to which the carrier element 40'' is connected at its lower end via the first joint 70'''. A connector element may alternatively also be connected to the lower end of the carrier element 40'', which can be inserted into a corresponding receptacle provided on the bottom wall.

The upper end of the carrier element 40'' is connected to the carriage 45' via the second joint 80. The axes of rotation of the first and second joints 70''', 80 extend horizontally and parallel to the rear wall 50a'' of the holder 50''.

The carriage 45' is guided in the guide rail 40a' such that it can be displaced in a longitudinal direction, and the guide rail 40a' is connected to the holder 50'' via the pivot joint 40c'', 50k''.

FIG. 20 shows the storage position of the device. The carrier element 40'', the guide rail 40a' and the holder 50'' are disposed vertically aligned one after the other in the receiving space 10d and are disposed on top of each other in mutually parallel planes. When a tablet computer is inserted into the holder 50'', its screen 60a' is approximately aligned with the outer wall 10d'' of the vehicle seat part 10a and can be used, however, only for one format.

FIG. 21 shows the holder 50'' in the first position of use in which the tablet computer can be inserted into or be removed from the holder 50'' and the holder 50'' can be turned about the axis of rotation 5b between an upright format and a transverse format.

The distance between the screen 60a' and the user can also be individually adjusted through movement of the holder 50'' by changing the angle of the carrier element 40'', the setting of the height of the screen 60a' can be individually adjusted through displacement of the carriage 45' on the guide rail 40a', and the angle of inclination of the screen 60a' can be individually adjusted through pivoting the carriage 45' about the second joint 80.

FIG. 22 shows the holder 50'' in the second position of use. The carrier element 40'' is horizontally supported on the bottom wall 10d', which forms a stable stop, and the guide rail 40a' with holder 50'' is displaced to the lowermost position on the carriage 45' and inclined towards the user.

FIGS. 23 through 29 show a modified embodiment of the third variant of the inventive device illustrated in FIGS. 17 through 19 with a third form of a transfer configuration.

An intermediate piece 90 is articulated to the connector element 30b' via the first joint 70' which pivots about the axis of rotation 5b''. The joint head 71, the axis of rotation 5b' of which extends at right angles to the axis of rotation 5b'', is arranged on the intermediate piece 90 and forms together with the bearing seat 71', formed at one end of the carrier element 40', the lower joint 71, 71'. The joint head 71 and the bearing seat 71' are held together by means of the connecting pin 50n'' which is connected to the intermediate piece 90.

The bearing seat 40c' is formed at the other end of the carrier element 40', and forms, together with the joint head 50k' which is disposed in the center of the rear wall 50a' of the holder 50', the upper joint 40c', 50k', the axis of rotation 5b of which extends parallel to the axis of rotation 5b' of the lower joint 71, 71'. The upper joint 40c', 50k' is held together with the connecting pin 50n' which is connected to the connecting sleeve 40g'.

The upper locking cam 41 and the lower locking cam 42 are disposed in the carrier element 40' between the upper joint 40c', 50k' and the lower joint 71, 71' such that they can be linearly displaced (FIG. 26, FIGS. 32/33), and are radially pretensioned against the axis of rotation 5b of the upper joint 40c', 50k', respectively 5b' of the lower joint 71, 71' by means of the pressure springs 43.

Four upper locking recesses 41', 41'', 41''', 41'''' are provided on the outer side of the joint head 50k', into which the upper locking cam 41 engages and retains the holder 50' in the two upright format positions and in the two transverse format positions.

Two lower locking recesses 42', 42'' are provided opposite to each other on the outer side of the joint head 71, into which the lower locking cam 42 engages and fixes the carrier element 40' in the two vertical positions in an upward and a downward direction.

The tablet computer 60 is held in the holder 50' by the concave receptacle 50b', which is disposed on a narrow side of the holder 50', and the holding clamp 51g, 51g', which is disposed on the opposite narrow side of the holder 50', is guided in clamp guidances 51o', 51o'' on the rear wall 50a', and is pretensioned by the tension spring 50i' against the tablet computer 60 in accordance with the principle explained above.

All four end faces of the tablet computer are covered by a border 51 which is disposed on the holder, is provided on its outer side with a safety radius, and is made from an elastic material such as e.g. silicone rubber.

A first stop 45c' is provided on the intermediate piece 90, which delimits the angle of inclination of the holder 50' with respect to the user in the first position of use when it impacts the housing of the connector element 30*b'*, and the projection of the carrier element 40' past the lower joint 71, 71' forms a second stop 45''' which delimits the angle of inclination of the holder 50' with respect to the user in the second position of use when it impacts the housing of the connector element 30*b'*.

The connector element 30*b'* can be folded parallel to the carrier element 40' to store it in a space-saving fashion (FIG. 27).

FIG. 30 shows a first alternative locking device for the lower joint 71, 71'. The joint head 71 is surrounded by a frame-shaped button element 44 which is disposed in the carrier element 40' and can be moved parallel to its longitudinal axis. On the side facing the end face 40*k* of the carrier element 40', the button element 44 has an actuator 44' which projects to the outside through a corresponding opening in the end face 40*k*.

On the side facing the upper joint 40*c'*, 50*k'*, the button element 44 is provided with a lower locking cam 42 which radially faces the joint head and is held in engagement with the lower locking recesses 42', 42" disposed on the outer side of the joint head 71. By exerting pressure onto the actuator 44', the locking device can be released and the carrier element 40' can be rotated into the other position of use.

FIG. 31 shows a second alternative locking device for the lower joint 71, 71'. The button element 44 is supported in the carrier element 40' concentrically with respect to the axis of rotation 5*b'* of the lower joint 71, 71' and can be moved parallel to the axis of rotation 5*b'*. The button element 44 is provided with an actuator 44' on the side facing the outer broad side 44*i* of the carrier element 40', which projects in an outward direction through a corresponding opening in the broad side 44*i*.

The button element 44 surrounds the joint head 71 and is forced to the outside by the spring 43', thereby holding the two locking cams 44" in engagement with the two locking recesses 42', 42". By exerting pressure onto the actuator 44', the locking device can be released and the carrier element 40' can be rotated into the other position of use.

FIGS. 32 and 33 show a modified embodiment of the locking device for the lower joint 71, 71' in accordance with FIG. 30. The joint head 71 is surrounded by a frame-shaped button element 44, which approximately extends over half the length of the carrier element 40' and is guided therein such that it can be displaced in a longitudinal direction. On the side facing the end face 40*k* of the carrier element 40', the button element 44 has an actuator 44' which projects to the outside through a corresponding opening in the end face 40*k* of the carrier element 40'.

An elongated hole 44" that is adjusted to the diameter of the joint head 71 is formed in the area of the lower joint 71, 71' in the button element 44, on the side of which facing the upper joint 40*c'*, 50*k'* a lower locking cam 42 is disposed, which radially faces the joint head 71 and is held in engagement with the lower locking recesses 42', 42", which are disposed on the outer side of the joint head 71, by means of the spring 43' which forces the button element 44 against the end face 40*k*. By exerting pressure onto the actuator 44', the locking device can be released and the carrier element 40' can be rotated into the respective other position of use.

FIG. 34 shows a section of the holder 50' in the area of the holding clamp 51*g* which can be displaced parallel to the rear wall 50*a'* and is pretensioned in the direction towards the upper joint 40*c'*, 50*k'* by means of a tension spring 50*i'* (FIG. 26), such that it extends over a tablet computer 60 inserted into the holder 50' and secures it in the holder 50' against falling out.

When the holding clamp 51*g* has been pushed to the outside to such an extent that it no longer extends over the tablet computer 60, the tablet computer is moved by the ejector spring 52, which is mounted to the rear wall 50*a'*, past the border 51 to such an extent that it can be conveniently grasped and removed from the holder 50'.

FIGS. 35 and 36 show an alternative embodiment of the carrier element 40', which comprises a first carrier rail 53*a* and a second carrier rail 53*b*, 53*b'* which are connected to each other and can be moved relative to each other in the longitudinal direction according to the principle of a telescopic slide guidance. For this reason, the separation between the lower joint 71, 71' and the upper joint 40*c'*, 50*k'* or the separation between the holder 50' and the first joint 70' can be variably adjusted to the requirements of the user in both positions of use. A manually releasable locking device (not shown) may be provided for fixing the respective settings.

FIGS. 37 to 44 show the device with a fastening device for use of the device outside of vehicles, which comprises a rectangular bottom plate 55*a* for setting up the fastening device on an even surface and a square housing 55*b* which extends flush with three edges of the bottom plate 55*a* and is disposed on a broad side of the bottom plate. The locating bushing 55*c* is arranged in the center of the housing 55*b* and its insertion opening 55*c'* is aligned with the inner side wall 55*b'* of the housing 55*b*.

The connector element 30*b'* is inserted into the locating bushing 55*c* parallel to the bottom plate 55*a* and is locked with the locking device 30*c'* in the locating bushing 55*c*.

The carrier element 40' with holder 50' can be inclined via the first joint 70' through 90° between a vertical and a horizontal position and be rotated at all angles of inclination through 360° about the lower joint 71, 71'. The holder 50' can also be rotated at all angles of inclination and positions of rotation of the carrier element 40' through 360° about the upper joint 40*c'*, 50*k'* as is illustrated in FIGS. 38 to 44.

Figure 45:
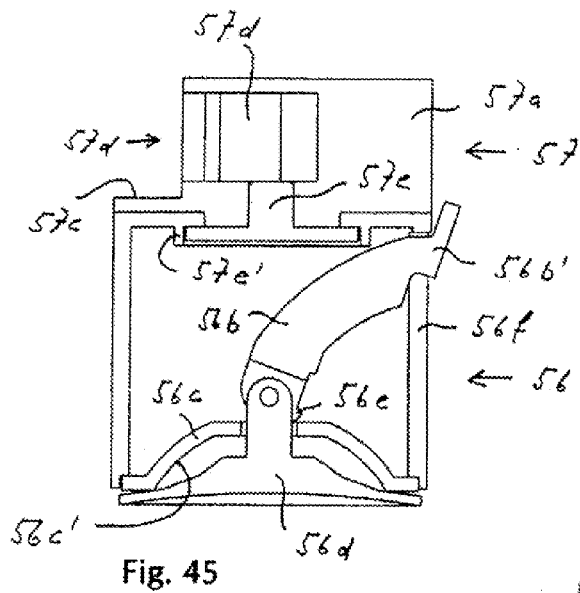
FIG. 45 shows a longitudinal section through a further fastening device for use of the device outside of vehicles with released suction holder.
Figure 46:
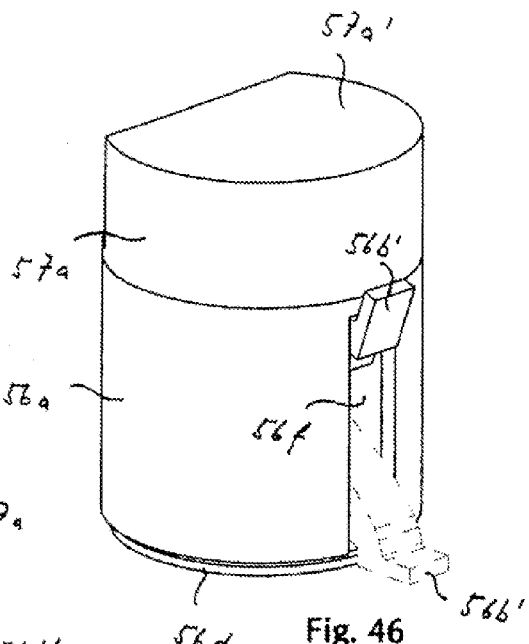
FIG. 46 shows a perspective view of the fastening device according to FIG. 45 at an angle from the front.
Figure 47:
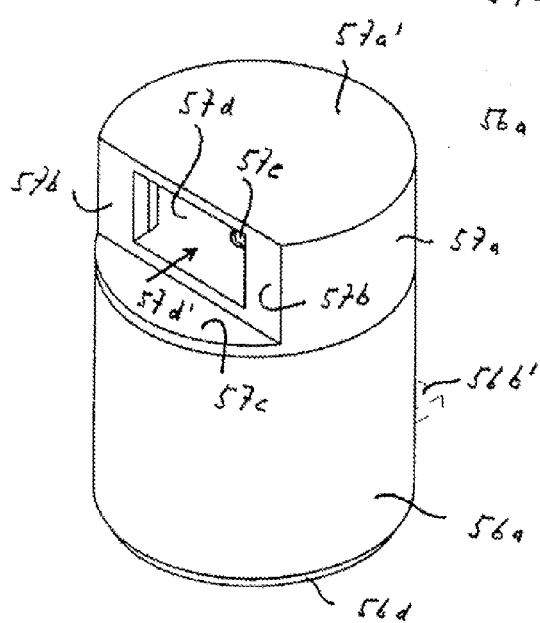
FIG. 47 shows a perspective view of the fastening device according to FIG. 45 at an angle from the rear.

FIGS. 45 to 47 show a further variant of a fastening device for mounting the device on a flat surface with a base 56 which is formed as a hollow cylinder, is open at the lower side, and accommodates a suction device with a bell-shaped hood 56*c*, a rubber pad 56*d* arranged below the hood 56*c*, and a rocker arm 56*b* disposed above the hood 56*c* with an eccentric 56*e* for retracting the rubber pad 56*d* into the hood 56*c*.

The rocker arm 56*b* projects through a slot 56*f*, which is arranged on the lateral area 56*a* of the base 56 and extends parallel to the longitudinal axis of the base 56, and can be actuated by an actuator 56*b'* from the outside between an upper position in which the rubber pad 56*d* is released and a lower position in which the rubber pad 56*d* is tensioned towards the inner side 56*c'* of the hood 56*c* and generates a vacuum that draws the rubber pad 56*d* to the mounting surface by suction.

The upper part 57 is disposed on the upper side of the base 56, is rotatably connected to the base 56, and accommodates the locating bushing 57*d*.

The upper part 57 has a round bottom plate 57*c* which is aligned with the lateral area 56*a* of the base 56. A housing with circular segment shaped cross-section is disposed on the bottom plate 57*c*, comprising a cylindrical section of the lateral area 57*a* and a straight end wall 57*b*, where the insertion opening 57*d'* of the locating bushing 57*d* is arranged. On its upper side, the upper part 57 is provided with a flat cover 57*a'*.

The base 56 and the upper part 57 are connected to the connecting element 57*e* which forms the pivot bearing together with the bearing seat 57*e'* that is arranged on the upper side of the base 56. The upper part 57 with the locating bushing 57d can then be rotated on the base 56 through 360°.

FIGS. 48 and 49 show the arrangement and guidance of the transfer button 58 in the border 59b, 59c, 59d of the holder 59, which is designed as a U-shaped profile which is open towards the rear side 59a of the holder 59, conically extends to the outside, and surrounds the end faces of the tablet computer 60 like a frame.

Openings 59b' and 59d' are provided in the inner end wall 59b and in the outer end wall 59d, in which openings the transfer button 58 is guided which is pretensioned in an outward direction by means of the spring 58d.

A hollow space 59f, which is open towards the rear side 59a, is provided between the inner end wall 59b and the outer end wall 59d, into which a stop bracket 58c projects, which is arranged on the transfer button 58 and secures the transfer button 58 from falling out.

In order to increase the stability of the border 59b, 59c, 59d of the holder 59, transverse ribs 59e are arranged on both sides of the transfer button 58, which connect the inner end wall 59b to the outer end wall 59d.

When the tablet computer 60 has been inserted into the holder 59, the inner end face 58b of the transfer button 58 is above the outer end face 60" of the button 60' of the tablet computer 60, which is activated upon exertion of pressure onto the outer end face 58a of the transfer button 58.

Figure 52:
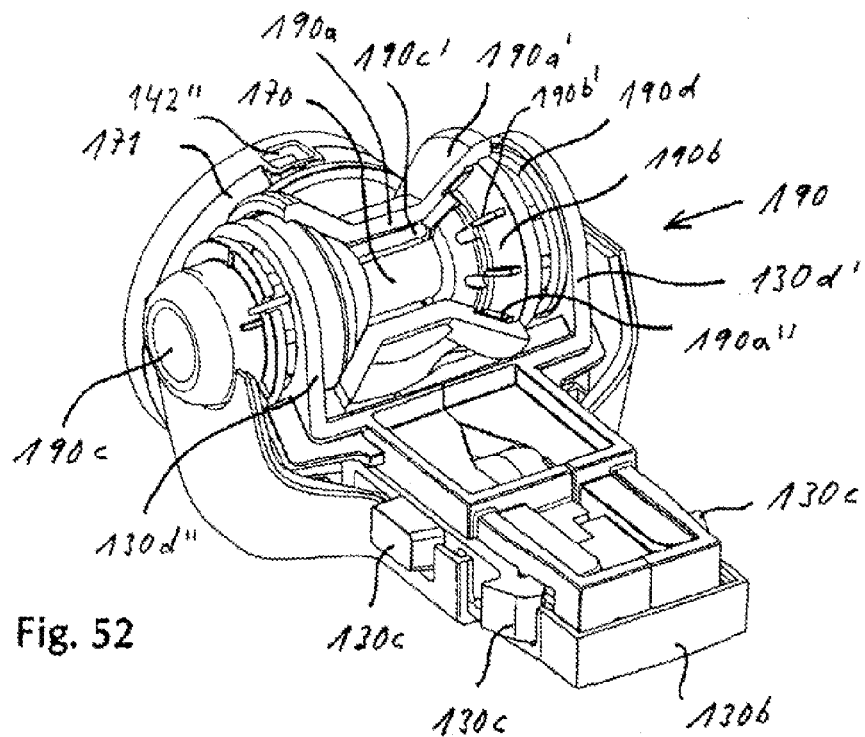
FIG. 52 shows a partially cut-free perspective view of the assembly: intermediate piece with connector element in accordance with FIGS. 50 and 51.

FIGS. 50 to 52 show a further modified embodiment of the third variant of the inventive device illustrated in FIGS. 17 through 19 and FIGS. 23 through 29 with the third embodiment of the transfer configuration.

FIGS. 50 and 51 show the three assemblies consisting of connector element 130b with connected intermediate piece 190, carrier element 140 and holder 150 from the front (FIG. 50) and from the rear (FIG. 51).

The intermediate piece 190 is connected to the connector element 130b via the first joint 170 that pivots about the axis of rotation 5b". The joint head 171 is arranged on the intermediate piece 190, the axis of rotation of which 5b' extends perpendicularly to the axis of rotation 5b" and which forms, together with the bearing seat 171' arranged at the lower end of the carrier element 140, the lower joint 171, 171'. The joint head 171 and the bearing seat 171' are held together by the connecting pin 150n".

The bearing seat 140c is arranged at the upper end of the carrier element 140 and forms, together with the joint head 150k arranged in the center of the rear wall 150a of the holder, the upper joint 140c, 150k, the axis of rotation of which extends parallel to the axis of rotation of the lower joint 171, 171'. The bearing seat 140c and the joint head 150k are held together with the connecting pin 150n' which is connected to the connecting sleeve 140g.

The four upper locking recesses 141', 141", 141'", 141'" are arranged on the outer side of the joint head 150k and are engaged by the upper locking cam 41 (FIG. 32), and the two lower locking recesses 142', 142" are arranged on the joint head 171, and are engaged by the lower locking cam 42 which can be released by the actuator 44'g (FIG. 32).

Four mirror-symmetrically arranged openings 150a' are provided in the rear wall 150a of the holder 150, which enable removal of the tablet computer 60 in that, after lifting the holding clamp 151g, the tablet computer can be pressed from the rear out of the holder in any position of the holder 150 to such an extent that it can be conveniently removed.

Two concave receptacles 150b', 150b" are provided on the side of the holder 150 opposite to the holding clamp 151g, into which the tablet computer is inserted at an angle and pivoted into the holder 150 until it is hooked behind the holding clamp 151g.

The two transfer buttons 158', 158" are inserted into the border 151 of the holder 150 as illustrated in FIGS. 48, 49 and are covered by an L-shaped cover 151' across the corners.

FIG. 52 shows the inner structure of the connector element 130b and of the intermediate piece 190 which comprises a pivot bearing 190a to which the intermediate piece 190 is connected such that it can be rotated with the connector element 130b, thereby forming the first joint 70, and also comprises the joint head 171 which is rotatably connected to the bearing seat 171' of the carrier element 140.

Pivoting arms 130d', 130d" are arranged like a fork on the connector element 130b and rotatably support the pivot bearing 190a. The pivot bearing 190a is widened like a funnel on both sides, wherein locking teeth 190a'" are mounted to the inner lateral area of one funnel 190a'.

A cone-shaped locking ring 190b is inserted between the funnel 190a' and the pivoting arm 130d', which has locking teeth 190b' on the side facing the funnel 190a'.

A pressure spring 190d is inserted between the locking ring 190b and the pivoting arm 130d', which pretensions the locking ring 190b against the funnel 190a' such that the locking teeth 190b' of the locking ring 190b engage in the locking teeth 190a" of the pivot bearing 190a, thereby blocking the position between the connector element 130b and the intermediate piece 190 or the carrier arm 140 and the holder 150.

For releasing the blockage, the push-button 190c arranged at the end face can be actuated, whereby the locking ring 190b is pressed via connecting rods 190c' against the pressure spring 190d such that the engagement of the locking teeth 190b' and the locking teeth 190a" is released and the intermediate piece 190 with the carrier arm 140 and the holder 150 can freely rotate.

Figure 53:
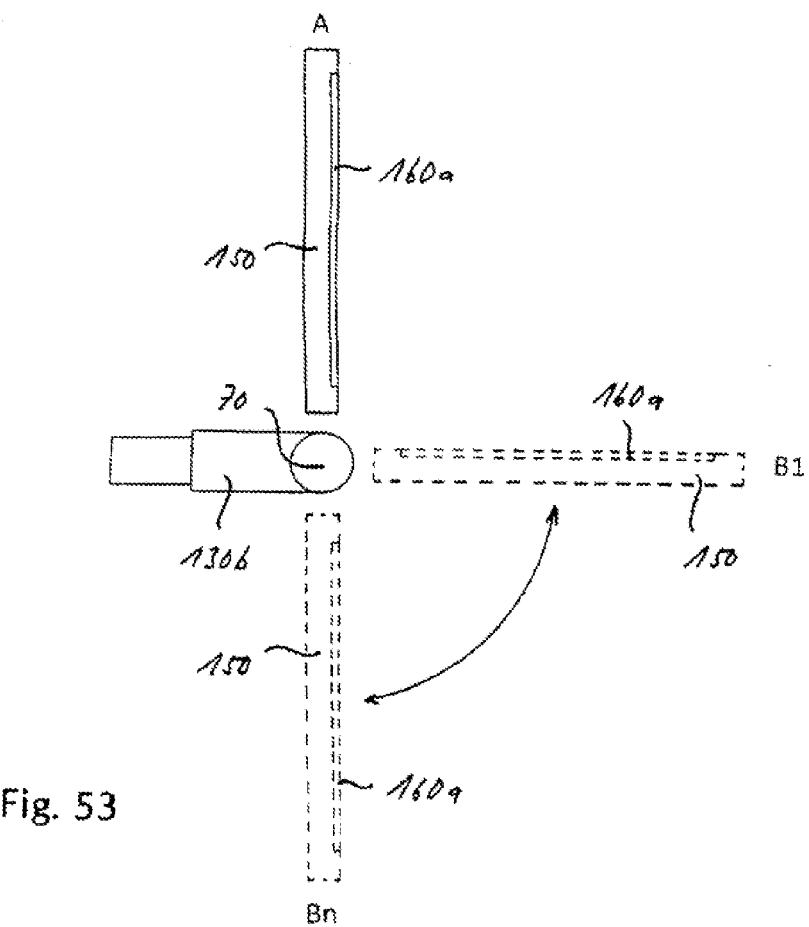
FIG. 53 shows a schematic view of the preferred positions of use of the holder with respect to the position of the connector element or of the first joint.

FIG. 53 shows a schematic view of the preferred positions of use of the holder 150 with respect to the connector element 130b or the first joint 70, wherein the screen 160a of a tablet computer that is inserted into the holder 150 remains oriented towards the user in all positions.

The symbol A thereby designates the first approximately vertical position of use substantially above the connector element 130b or above the first joint 70, and B1 to Bn designate the inclined positions between an approximately horizontal and an approximately vertical second position of use substantially below the connector element 130b or below the first joint 70. Different inclined positions B2, B3 . . . Bn can be assumed between B1 and Bn.

Figure 54:
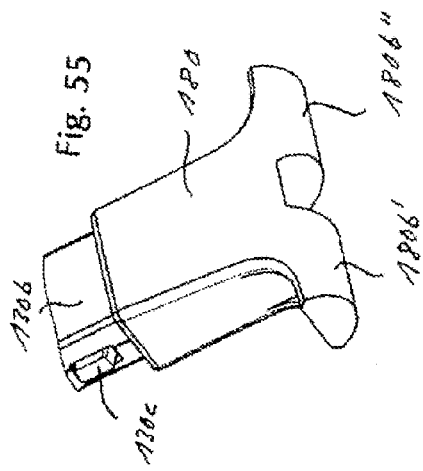
FIG. 54 shows a perspective view of a mounting foot for use of the device outside of vehicles.
Figure 55:
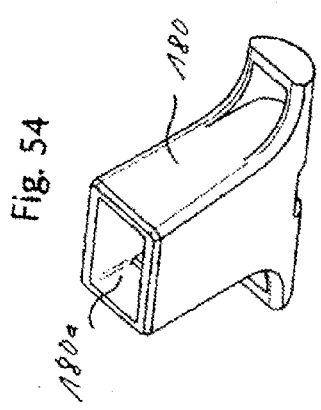
FIG. 55 shows a perspective view of the mounting foot in accordance with FIG. 54 on the connector element.
Figure 56:
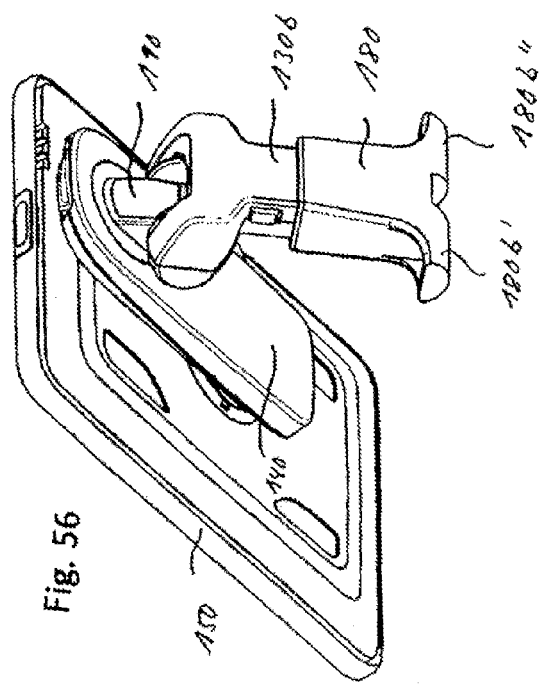
FIG. 56 shows a perspective view of the device with mounting foot on the folded-out connector element in accordance with FIG. 55 and the holder in a transverse format position.

FIGS. 54 to 56 show a mounting foot by means of which the device can be used on flat surfaces outside of vehicles.

The mounting foot has a T-shape and comprises a receiving space 180a for the connector element 130b and two laterally projecting struts 180b', 180b" for supporting the device. The mounting foot 180 is advantageously produced from an elastic material in order to provide a slight clamping effect with respect to the connector element 130b and secure the device from being displaced.

The invention has been described above with reference to several embodiments of devices, in which each holder for the tablet computer can be moved at least between a first position of use and a second position of use by means of a transfer configuration. It is clear that further positions, in particular positions in which the device is held in a stowed away position, e.g. in a storage position in a housing, are also possible.

The exemplary transfer configurations ensure that the screen side of the tablet computer remains oriented towards the user in each position of use and at the same time that the tablet computer can remain in the holder. The transfer configuration advantageously enables overlapping of two movements during transfer between the positions of use. The tablet computer can moreover be rotated together with the holder about a pivot axis between an upright format and a transverse format in any position of use.

By way of example, FIGS. 20 through 22 describe one embodiment for installation in a receiving space located on the rear side of a back rest or of a head rest, comprising a transfer configuration in correspondence with FIG. 6. It is clear that the further described variants of transfer configurations can also be installed into a corresponding receiving space.

Extraction means for moving the device out of the receiving space may be provided so that the device can be guided past the boundaries of the receiving space without striking against it, where this is required. The extraction means may e.g. be designed as a joint or linear guidance and displace the overall carrier element or at least one end of the carrier element facing the holder out of the receiving space.

We claim:

1. A device for attaching a tablet computer to a rear side of a motor vehicle seat part, to a back rest, a head rest or to a head rest mounting of a vehicle seat, the device comprising:
    a fastening device for mounting the device to the vehicle seat part;
    a carrier element movably connected to said fastening device;
    a holder movably connected to said carrier element for receiving the tablet computer, said carrier element being structured to move said holder between a first position of use, in which a screen of the tablet computer is oriented in an approximately vertical direction facing away from the vehicle seat part and a second position of use, in which the screen of the tablet computer assumes an oblique orientation intermediate between a substantially horizontal and a substantially vertical position;
    a first joint disposed between and connecting said carrier element to said fastening device, said first joint being structured to rotate about a horizontal first joint axis which is parallel to a wide rear side of the vehicle seat part;
    a pivot joint disposed between said carrier element and said holder, said pivot joint having a rotation pivot joint axis which is perpendicular to both a wide side of said holder and to said first joint axis such that said holder can be rotated between vertical and transverse formats;
    an intermediate piece pivotably cooperating with said first joint and disposed between said first joint and said carrier element; and
    a third joint connected between said intermediate piece and said carrier element, said third joint having a third joint axis extending and always remaining parallel to said pivot joint axis, wherein motion of said holder between said first and said second positions of use is carried out by rotating said carrier element about said third joint axis and pivoting said carrier element about said first joint axis.

2. The device of claim 1, further comprising locking means or stops disposed and structured to lock said carrier element in at least approximately vertical upper and lower orientations thereof.

3. The device of claim 2, wherein an operational release button is provided for releasing said locking means.

4. The device of claim 3, wherein said release button is arranged on said carrier element or on said intermediate piece adjacent to said third joint.

5. The device of claim 1, wherein said holder has a rectangular rear wall, end faces of which have lateral supports for the tablet computer.

6. The device of claim 5, wherein two supports arranged on opposite end faces are designed as clamps and extend over the tablet computer when inserted into said holder, wherein at least one of said two clamp-shaped supports is spring-loaded and moves past a rear wall to an outside for inserting or removing the tablet computer.

7. The device of claim 1, wherein said carrier element is connected to said fastening device via a coupling having a manually releasable locking device, said coupling having a receptacle for accepting a connector element.

8. The device of claim 7, wherein said first joint is arranged between said connector element and said carrier element.

9. The device of claim 7, wherein said fastening device comprises a clamping element which can be clamped between two head rest columns of a head rest mounting, wherein a locating bushing is arranged approximately in a center of said clamping element.

10. The device of claim 7, wherein at least one said intermediate piece is disposed between said fastening device and said holder, said intermediate piece having two mutually perpendicular pivot axes.

11. The device of claim 10, wherein said intermediate piece is connected to an end of said carrier element via a joint that is associated with one of the two mutually perpendicular pivot axes.

12. The device of claim 10, wherein said intermediate piece is connected to said connector element via said first joint.

13. The device of claim 10, wherein said intermediate piece comprises a joint head which is rotatably connected to a bearing seat of said carrier element.

14. The device of claim 1, wherein said first joint is provided with a positive-locking locking device which can be released by a push button that is arranged on an end face.

15. The device of claim 1, wherein said holder is substantially positioned above said fastening device in said first position of use and substantially positioned below said fastening device in said second position of use.

16. The device of claim 1, wherein stops are provided which limit an angle of inclination of said holder with respect to a user at least in said two positions of use in order to avoid endangering passengers in case of an accident.

17. The device of claim 1, wherein said pivot joint is arranged at a point of intersection of diagonals of a broad side of said holder such that said holder remains centered with respect to the vehicle seat or a mounting position thereof both in said upright format position and in said transverse format position.

18. The device of claim 1, wherein said holder has a rim extending about an entire periphery thereof at a height of an edge of the table computer or projecting past same and having an outward safety radius, said edge of said holder thereby being configured as a double-walled U closed at a side of the screen in order to increase strength and to facilitate introduction of larger safety radii.

19. The device of claim 1, wherein openings are provided in a rear wall of said holder such that the tablet computer can be pushed from a rear position out of said holder when a holding clamp has been released.

20. The device of claim 1, wherein the device can be installed in a receiving space that is formed on a rear side of the back rest or a head rest such that the device is substantially accommodated in a body of the vehicle seat in said first position of use and the screen of the tablet computer is approximately aligned with an outer side of the vehicle seat part.

21. The device of claim 1, wherein for rotating said holder or the tablet computer between said upright format and said transverse format and/or for inserting and removing the tablet computer and for moving said holder or the tablet computer into said second position of use, the device or said holder can be moved to a corresponding extent out of the receiving space by means of an extracting device, wherein said extracting device is selected from the group consisting of a linear guidance, a pivot joint and an axis of rotation that can be telescopically expanded.

\* \* \* \* \*